US012168828B2

(12) United States Patent
Paik et al.

(10) Patent No.: US 12,168,828 B2
(45) Date of Patent: Dec. 17, 2024

(54) TRANSITION METAL-DOPED NICKEL PHOSPHIDE NANOSTRUCTURE, METHOD FOR PREPARING SAME, AND CATALYST FOR ELECTROCHEMICAL WATER DECOMPOSITION INCLUDING TRANSITION METAL-DOPED NICKEL PHOSPHIDE NANOSTRUCTURE

(71) Applicants: S-Oil Corporation, Seoul (KR); POSTECH Research and Business Development Foundation, Gyeongsangbuk-do (KR)

(72) Inventors: Sangcheol Paik, Gyeonggi-do (KR); Kijung Yong, Gyeongsangbuk-do (KR); Hyogyun Roh, Gyeongsangbuk-do (KR)

(73) Assignees: S-Oil Corporation, Seoul (KR); POSTECH Research and Business Development Foundation, Gyeongsangbuk-do (KR)

( * ) Notice: Subject to any disclaimer, the term of this patent is extended or adjusted under 35 U.S.C. 154(b) by 295 days.

(21) Appl. No.: 17/854,075

(22) Filed: Jun. 30, 2022

(65) Prior Publication Data
US 2023/0002922 A1 Jan. 5, 2023

(30) Foreign Application Priority Data
Jul. 2, 2021 (KR) .......................... 10-2021-0086940

(51) Int. Cl.
C25B 11/075 (2021.01)
C23C 18/12 (2006.01)
(Continued)

(52) U.S. Cl.
CPC ........ *C25B 11/075* (2021.01); *C23C 18/1216* (2013.01); *C23C 18/1295* (2013.01); *C25B 1/04* (2013.01); *C25B 11/061* (2021.01)

(58) Field of Classification Search
CPC .................................................. C23C 18/1216
See application file for complete search history.

(56) References Cited

FOREIGN PATENT DOCUMENTS

| CN | 112237931 | 1/2021 | |
|----|-----------|--------|---|
| CN | 112237931 A * | 1/2021 | .......... B01J 27/1853 |

(Continued)

OTHER PUBLICATIONS

He et al., "High-performance alkaline hydrogen evolution of NiMoP2 nanowire boosted by bimetallic synergic effect," 2019, International Journal of Hydrogen Energy 44, pp. 23066-23073 (Year: 2019).*

(Continued)

*Primary Examiner* — Robert A Vetere
(74) *Attorney, Agent, or Firm* — DUANE MORRIS LLP; Gregory M. Lefkowitz

(57) ABSTRACT

The present disclosure relates to a transition metal-doped nickel phosphide nanostructure, a method for preparing the same, and a catalyst for electrochemical water decomposition including the transition metal-doped nickel phosphide nanostructure. More specifically, a transition metal-doped nickel phosphide nanostructure can be prepared by converting a zinc oxide nanostructure grown on a substrate vertically by hydrothermal synthesis to a transition metal-doped nickel oxide nanostructure by cation exchange and then phosphorizing the nickel oxide. The transition metal-doped nickel phosphide nanostructure of the present disclosure is advantageous in that it has superior catalytic activity and conductivity due to large surface area. In addition, when used as a catalyst for water decomposition under an alkaline condition, it has a low overvoltage and can have excellent (Continued)

catalytic activity for hydrogen evolution reaction or oxygen evolution reaction.

12 Claims, 27 Drawing Sheets

(51) Int. Cl.
C25B 1/04 (2021.01)
C25B 11/061 (2021.01)

(56) References Cited

FOREIGN PATENT DOCUMENTS

| KR | 10-1670860 | 10/2016 |
|---|---|---|
| KR | 10-2021-0052611 | 5/2021 |

OTHER PUBLICATIONS

CN112237931, machine translation. (Year: 2021).*

Yu et al., "Hierarchical NiFeP microflowers directly grown on Ni foam for efficient electrocatalytic oxygen evolution", 2019, J. Mater. Chem. A, vol. 5, p. 11229) (Year: 2019).*

Diao et al., "Bifunctional and Self-Supported NiFeP-Layer-Coated NiP Rods for Electrochemical Water Splitting in Alkaline Solution", Appl. Mater. & Interfaces 2021, 13, pp. 23072-23713. (Year: 2021).*

Ray et al., "Aggrandizing the Photoactivity of ZnO Nanorods toward N2 Reduction and H2 Evolution through Facile In Situ Coupling with NixPy", Sustainable Chem. Eng. Sep. 2021, pp. 6305-6317. (Year: 2021).*

Sun, Y., et al., "Mo doped Ni2P Nanowire Arrays: An Efficient Electrocatalyst for Hydrogen Evolution Reaction with Enhanced Activity at All pH Values," Royal Society of Chemistry/Nanoscale Accepted Manuscript, 2017, DOI: 10.1039/C7NR03515B.

He, X., et al., "High-performance alkaline hydrogen evolution of NiMoP2 nanowire boosted by bimetallic synergic effect," International Journal of Hydrogen Energy, 2019, vol. 44, pp. 23066-23073.

Abstract of "NiFeP/NiMoP as OER/HER catalyst for OWS in Alkaline media," 2021 KIChE Spring Meeting—Chemical Engineering for a Sustainable Society in the New Normal Era, Apr. 2021, ISSN 2384-1370.

Wang, H., et al., "Fabrication of a porous NiFeP/Ni electrode for highly efficient hydrazine oxidation boosted H2 evolution," Nanoscale Adv., Mar. 2021, 2280-2286.

Roh, H., et al., "Various metal (Fe, Mo, V, Co)-doped Ni2P nanowire arrays as overall water splitting electrocatalysts and their applications in unassisted solar hydrogen production with STH 14%," Applied Catalysis B: Environmental, 2021, 297, 120434.

Diao, F., et al., "Bifunctional and Self-Supported NiFeP-Layer-Coated NIP Rods for Electrochemical Water Splitting in Alkaline Solution," ACS Appl. Mater. Interfaces 2021, 13, 20, 23702-23713 (May 11, 2021).

* cited by examiner

TRANSITION METAL-DOPED NICKEL PHOSPHIDE NANOSTRUCTURE, METHOD FOR PREPARING SAME, AND CATALYST FOR ELECTROCHEMICAL WATER DECOMPOSITION INCLUDING TRANSITION METAL-DOPED NICKEL PHOSPHIDE NANOSTRUCTURE

CROSS-REFERENCE TO RELATED APPLICATION

This application claims priority to Korean Patent Application No. 10-2021-0086940 filed on Jul. 2, 2021, and all the benefits accruing therefrom under 35 U.S.C. § 119, the contents of which in its entirety are herein incorporated by reference.

BACKGROUND

1. Field

The present disclosure relates to a transition metal-doped nickel phosphide nanostructure, a method for preparing the same, and a catalyst for electrochemical water decomposition, which includes the transition metal-doped nickel phosphide nanostructure.

2. Description of the Related Art

With ongoing industrial development, fossil fuels such as coal, petroleum, natural gas, etc. are being depleted. In addition, due to the problems of environmental pollution, global warming, etc. by the fossil fuels, development of energy sources capable of replacing the fossil fuel is being demanded. As alternative energy technologies, conversion of natural energy such as solar power, wind power, tidal power, etc. to electrical energy, production of hydrogen energy using natural resources such as water, etc. are being researched and developed globally.

Among them, renewable hydrogen fuel is drawing a lot of attentions in order to cope with the global $CO_2$ regulation issue. Although reforming is a general method of producing hydrogen, it has the problems that the process is performed at high temperature and high pressure and it is not environmentally friendly because carbon dioxide is generated during the production of hydrogen. Therefore, many researchers are paying attention to a more effective water decomposition method.

For effective water decomposition, both a hydrogen evolution catalyst and an oxygen evolution catalyst should have high performance in the same electrolyte. In addition, since the process of intermediates formed from water decomposition are attached to and then detached from the surface of the catalyst is repeated and, therefore, catalyst activation energy is necessary, provision of many active sites and fast charge transport on the catalyst surface are important for effective production of hydrogen.

However, the existing water decomposition catalysts are expensive because precious metal catalysts such as platinum (Pt), ruthenium (Ru), iridium (Ir) are used. Although several researches are being conducted on transition metal oxides as non-precious metal catalyst for replacing the precious metal catalysts recently, low hydrogen evolution reaction (HER) activity and low conductivity are big obstacles to the production of hydrogen.

Accordingly, research and development are necessary for a new non-precious metal catalyst based on a transition metal, instead of a precious metal catalyst, which resolves the disadvantage of the non-precious metal catalysts and has improved catalytic activity and conductivity.

REFERENCES OF THE RELATED ART

Patent Documents (Patent document 1) Korean Patent Registration No. 10-1670860.

SUMMARY

The present disclosure is directed to providing a transition metal-doped nickel phosphide nanostructure which exhibits superior electrochemical stability and durability and, at the same time, improved catalytic activity and conductivity due to large surface area.

The present disclosure is also directed to providing a catalyst for electrochemical water decomposition, which has superior catalytic activity for hydrogen evolution reaction or oxygen evolution reaction by including the transition metal-doped nickel phosphide nanostructure.

The present disclosure is also directed to providing an electrode including the catalyst for electrochemical water decomposition.

The present disclosure is also directed to providing an electrochemical water decomposition device including the electrode, a counter electrode and an electrolyte or an ionic liquid.

The present disclosure is also directed to providing a method for preparing a transition metal-doped nickel phosphide nanostructure.

The present disclosure provides a transition metal-doped nickel phosphide nanostructure including: a substrate; and a plural transition metal-doped nickel phosphide nanostructure grown and aligned on the substrate in a vertical direction, wherein the transition metal-doped nickel phosphide nanostructure is doped with a transition metal on the entire surface or a portion thereof.

The present disclosure also provides a catalyst for electrochemical water decomposition, which includes the transition metal-doped nickel phosphide nanostructure.

The present disclosure also provides an electrode including the catalyst for electrochemical water decomposition.

The present disclosure also provides an electrochemical water decomposition device including the electrode, a counter electrode and an electrolyte or an ionic liquid.

The present disclosure also provides a method for preparing a transition metal-doped nickel phosphide nanostructure, which includes: a step of adding a zinc precursor and a hydroxide on a substrate and growing a plural zinc oxide nanostructure aligned on the substrate in a vertical direction; a step of adding a nickel precursor and a transition metal precursor on the zinc oxide nanostructure and converting the zinc oxide nanostructure to a transition metal-doped nickel oxide nanostructure through primary heat treatment; and a step of adding a phosphorus precursor to the transition metal-doped nickel oxide nanostructure and preparing a transition metal-doped nickel phosphide nanostructure through secondary heat treatment.

The transition metal-doped nickel phosphide nanostructure according to the present disclosure is advantageous in that it has superior electrochemical stability and durability and, at the same time, superior catalytic activity and conductivity due to large surface area. Therefore, when used as a catalyst for water decomposition under an alkaline condition, it has a low overvoltage and can have excellent catalytic activity for hydrogen evolution reaction or oxygen evolution reaction.

DETAILED DESCRIPTION

Figure 1:
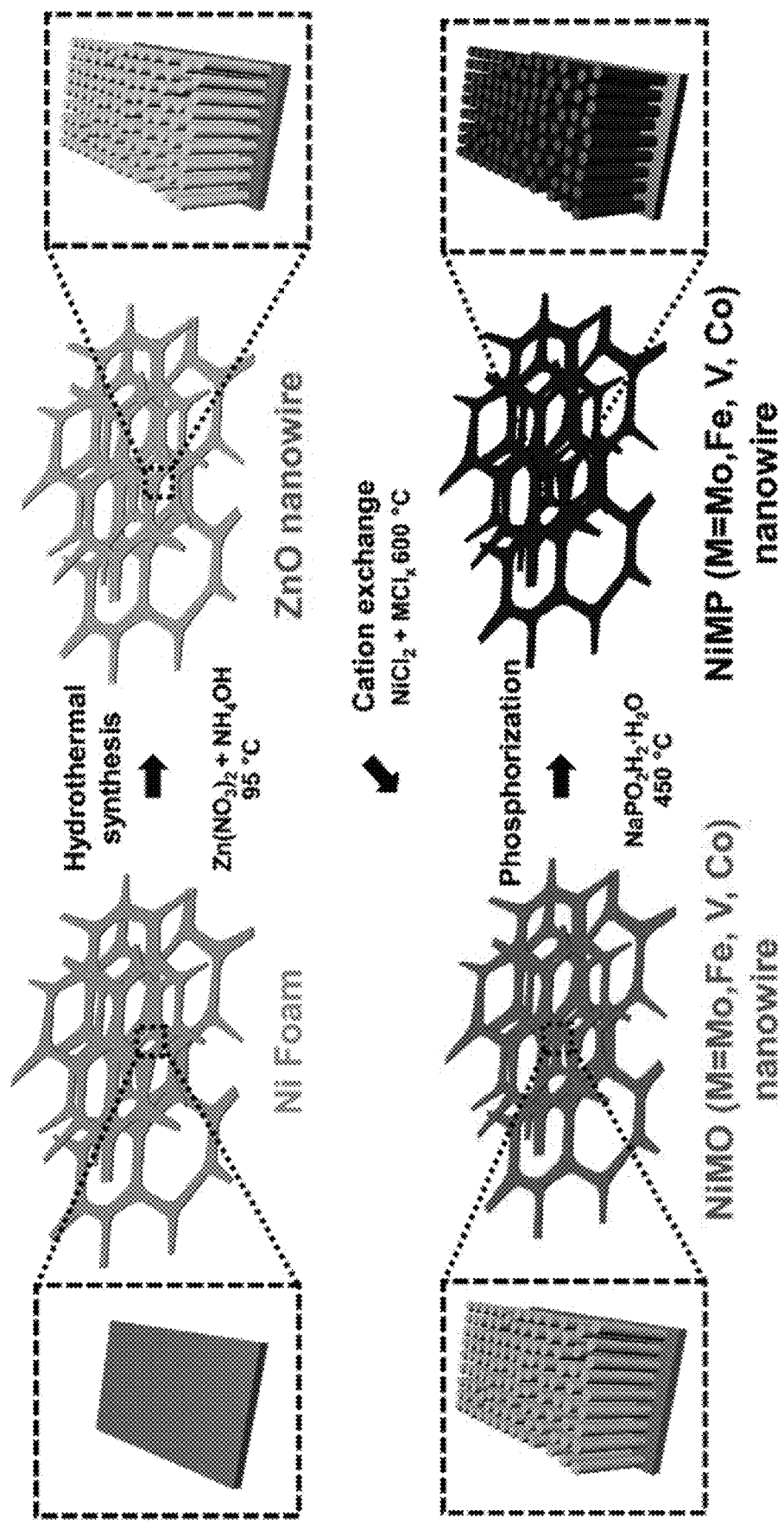
FIG. 1 schematically shows a process of preparing a transition metal-doped nickel phosphide nanostructure according to the present disclosure.

Hereinafter, exemplary embodiments of the present disclosure are described in more detail.

The present disclosure relates to a transition metal-doped nickel phosphide nanostructure, a method for preparing the same, and a catalyst for electrochemical water decomposition including the transition metal-doped nickel phosphide nanostructure.

As described above, hydrogen production through electrolysis requires high cost because a precious metal catalyst should be used. Although non-precious metal catalysts based on transition metal oxides have been studied to replace the precious metal catalyst, commercial-scale hydrogen production is difficult due to low hydrogen evolution reaction activity and low conductivity.

According to the present disclosure, a transition metal-doped nickel phosphide nanostructure can be prepared by converting a zinc oxide nanostructure grown on a substrate vertically by hydrothermal synthesis to a transition metal-doped nickel oxide nanostructure by cation exchange and then phosphorizing the nickel oxide. The transition metal-doped nickel phosphide nanostructure of the present disclosure is advantageous in that it has superior catalytic activity and conductivity due to large surface area. In addition, when used as a catalyst for water decomposition under an alkaline condition, it can exhibit low overvoltage and significantly improved hydrogen or oxygen evolution reaction efficiency.

Specifically, the present disclosure provides a transition metal-doped nickel phosphide nanostructure including: a substrate; and a plural transition metal-doped nickel phosphide nanostructure grown and aligned on the substrate in a vertical direction, wherein the transition metal-doped nickel phosphide nanostructure is doped with a transition metal on the entire surface or a portion thereof.

Specifically, the substrate can be a material which has superior conductivity, facilitates gas diffusion and has many active sites. Specifically, it can be a nickel foam, although not being limited thereto.

The nickel phosphide nanostructure is doped with a transition metal on the entire surface or a portion thereof, such that the nickel phosphide and the doped transition metal have optimum electronic structure and, thus, can activate water decomposition interaction. In addition, by using a transition metal instead of a precious metal and forming a plural nanostructure grown and aligned on the substrate in a vertical direction, the catalytic activity for hydrogen evolution reaction or oxygen evolution reaction under an alkaline condition can be improved significantly owing to large surface area and superior physical stability.

The nickel phosphide of the transition metal-doped nickel phosphide nanostructure can be NiP, $Ni_2P$ or a mixture thereof, specifically $Ni_2P$. In particular, since the $Ni_2P$ exhibits lower negative charge (−0.07 eV) as compared to other nickel phosphides, it can provide a space for adsorption of an ion on the surface during hydrogen evolution reaction or oxygen evolution reaction and thus can provide highly improved performance.

The nickel phosphide nanostructure can have a layered structure and can have an interplanar distance (d-spacing) of 0.1-0.5 nm, specifically 0.2-0.3 nm, most specifically 0.21-0.24 nm, as measured by X-ray diffractometry.

The transition metal of the transition metal-doped nickel phosphide nanostructure can be one or more selected from a group consisting of Fe, Mo, V and Co, specifically Fe or Mo. The transition metal-doped nickel phosphide nanostructure is favorable in that it has higher conductivity and is more effective for water decomposition than a non-precious metal catalyst using a transition metal oxide owing to electron delocalization due to low electronegativity.

The doping amount of the transition metal in the transition metal-doped nickel phosphide nanostructure can be 1-20 wt %, specifically 2-18 wt %, most specifically 7-16 wt %, based on 100 wt % of the nickel phosphide nanostructure. If the transition metal doping amount is less than 1 wt %, conductivity and catalytic activity may be decreased. Otherwise, if it exceeds 20 wt %, catalytic reaction may be interrupted due to excessive doping of the transition metal in the nickel phosphide.

The transition metal-doped nickel phosphide nanostructure can be a plural nanostructure grown and aligned on the substrate in a vertical direction to provide an increased reaction area of a catalyst. It can be in the form of a nanowire, a nanotube or a nanorod, specifically a nanowire. The transition metal-doped nickel phosphide nanostructure can improve catalytic activity by providing many active sites on the catalyst surface due to its large surface area. In addition, since porous nickel foam is integrated with the substrate, current can be transferred easily and reactants and products can be diffused appropriately.

The transition metal-doped nickel phosphide nanostructure can have an average diameter of 80-200 nm, specifically 90-150 nm, more specifically 95-120 nm, most specifically 98-110 nm. If the average diameter is smaller than 80 nm, the nanostructure may collapse during reaction due to weak physical stability. Otherwise, if it exceeds 200 nm, catalytic activity may be decreased due to decrease in catalyst surface area.

The present disclosure also provides a catalyst for electrochemical water decomposition, which includes the transition metal-doped nickel phosphide nanostructure.

The catalyst for electrochemical water decomposition can be applied as a catalyst for hydrogen evolution reaction or a catalyst for oxygen evolution reaction.

As a specific example, the catalyst for hydrogen evolution reaction can include a molybdenum (Mo)-doped nickel phosphide nanostructure.

As a specific example, the catalyst for oxygen evolution reaction can include an iron (Fe)-doped nickel phosphide nanostructure.

The present disclosure also provides an electrode including the catalyst for electrochemical water decomposition.

The present disclosure also provides an electrochemical water decomposition device including the electrode, a counter electrode and an electrolyte or an ionic liquid.

The present disclosure also provides a method for preparing a transition metal-doped nickel phosphide nanostructure, which includes: a step of adding a zinc precursor and a hydroxide on a substrate and growing a plural zinc oxide nanostructure aligned on the substrate in a vertical direction; a step of adding a nickel precursor and a transition metal precursor on the zinc oxide nanostructure and converting the zinc oxide nanostructure to a transition metal-doped nickel oxide nanostructure through primary heat treatment; and a step of adding a phosphorus precursor to the transition metal-doped nickel oxide nanostructure and preparing a transition metal-doped nickel phosphide nanostructure through secondary heat treatment.

FIG. 1 schematically shows a process of preparing a transition metal-doped nickel phosphide nanostructure according to the present disclosure. Referring to FIG. 1, after adding a zinc precursor and a hydroxide on a substrate of nickel foam, a plural zinc oxide nanostructure aligned on the substrate in a vertical direction can be grown by hydrothermal synthesis. Then, after adding a nickel precursor and a transition metal precursor to the zinc oxide nanostructure, the zinc oxide nanostructure can be converted to a transition metal-doped nickel oxide nanostructure by cation exchange. Then, after adding a phosphorus precursor, a transition metal-doped nickel phosphide nanostructure can be formed by phosphorizing the nickel oxide nanostructure.

Hereinafter, each step will be described in detail.

In the step of growing the zinc oxide nanostructure, zinc ion is generated when hydrothermal synthesis is conducted after a zinc precursor and a hydroxide are added on a substrate. Then, a plural zinc oxide nanostructure grown and aligned on the substrate in a vertical direction with a uniform size can be grown by oxidation with the hydroxide. The zinc precursor can be one or more selected from a group consisting of $Zn(NO_3)_2$, $Zn(OH)_2$ and $Zn(CH_3)_2$, specifically $Zn(NO_3)_2$.

The hydroxide can be one or more selected from a group consisting of ammonium hydroxide ($NH_4OH$), sodium hydroxide (NaOH), potassium hydroxide (KOH), barium hydroxide ($Ba(OH)_2$) and lithium hydroxide (LiOH), specifically ammonium hydroxide ($NH_4OH$).

The zinc precursor and the hydroxide can be mixed at a weight ratio of 1:1-3:140, specifically 3:10-3:50, most specifically 3:20-1:10. If the mixing ratio of the zinc precursor and the hydroxide does not satisfy the above range, a nanowire may not be grown.

The zinc oxide nanostructure can be grown by hydrothermal synthesis. The hydrothermal synthesis can be performed at 80-200° C. for 2-24 hours, specifically at 85-150° C. for 4-12 hours, most specifically at 90-100° C. for 6-8 hours. If the hydrothermal synthesis temperature and time do not satisfy the above ranges, the catalyst surface area may be decreased and charge transfer may be interrupted as the zinc oxide nanostructure is formed on the substrate with nonuniform size and without alignment.

In the step of conversion to the transition metal-doped nickel oxide nanostructure, by conducting primary heat treatment after adding a nickel precursor and a transition metal precursor on the zinc oxide nanostructure, zinc oxide is converted to nickel oxide as zinc atom is completely exchanged with nickel atom with the structure of the zinc oxide nanostructure intact, and the zinc oxide nanostructure can be converted to a transition metal-doped nickel oxide nanostructure by doping a dopant transition metal at the same time.

The nickel precursor can be one or more selected from a group consisting of nickel acetate, nickel halide, nickel nitrate, nickel hydroxide and nickel carbonyl, specifically nickel halide. As a specific example, the nickel halide can be one selected from a group consisting of $NiCl_2$, $NiBr_2$ and $NiI_2$, specifically $NiCl_2$.

The transition metal precursor can be $M_xCl_y$ (wherein M is Mo, Fe, V or Co, x satisfies $1 \leq x \leq 5$ and y satisfies $2 \leq y \leq 10$). As a specific example, the transition metal precursor can be $Mo_2Cl_{10}$, $FeCl_3$, $VCl_3$ or $CoCl_2$, specifically $Mo_2Cl_{10}$ or $FeCl_3$.

The nickel precursor and the transition metal precursor can be mixed at a weight ratio of 100:1-1:1, specifically 20:1-2:1, most specifically 10:1-5:1. If the mixing ratio of the nickel precursor and the transition metal precursor does not satisfy the above range, nickel crystal may not be formed and a nanowire may not grow properly.

In the step of conversion to the transition metal-doped nickel oxide nanostructure, the primary heat treatment can be performed by cation exchange at 550-850° C. for 0.3-4 hours. The primary heat treatment can be performed specifically at 580-700° C. for 0.4-2 hours, most specifically at 590-610° C. for 0.5-1 hour.

If the primary heat treatment temperature is below 550° C. or if the heat treatment time is shorter than 0.3 hour, enough reaction sites for adsorbing ions on the surface may not be formed since zinc atoms are not completely exchanged with nickel atoms and the nanostructure may not be rigidly maintained by anion lattices.

Otherwise, if the primary heat treatment temperature exceeds 850° C. or if the heat treatment time exceeds 4 hours, the crystal structure of the nanostructure may be disrupted due to high temperature.

In the step of preparing the transition metal-doped nickel phosphide nanostructure, the transition metal-doped nickel phosphide nanostructure having high crystallinity can be prepared by adding a phosphorus precursor to the transition metal-doped nickel oxide nanostructure and phosphorizing the nickel oxide of the nickel oxide nanostructure through secondary heat treatment.

The phosphorus precursor can be one or more selected from a group consisting of sodium hypophosphite ($NaPO_2H_2 \cdot H_2O$), phosphoric acid ($H_3PO_4$), monoammonium phosphate ($NH_4H_2PO_4$), diammonium phosphate (($NH_4)_2HPO_4$), triethylphosphine (($C_2H_5)_3P$) and trimethylphosphine (($CH_3)_3P$). Specifically, it can be sodium hypophosphite ($NaPO_2H_2 \cdot H_2O$).

In the step of preparing the transition metal-doped nickel phosphide nanostructure, the phosphorization can be achieved by performing the secondary heat treatment at 300-500° C. for 0.5-4 hours, specifically at 400-480° C. for 0.75-3 hours, most specifically at 430-470° C. for 1-2 hours. If the secondary heat treatment temperature and time do not satisfy the above ranges, nickel phosphide crystals may not be formed enough.

The nickel phosphide nanostructure can have a layered structure and can have an interplanar distance (d-spacing) of 0.1-0.5 nm, specifically 0.2-0.3 nm, most specifically 0.21-0.24 nm, as measured by X-ray diffractometry.

Although it was not explicitly described in the following examples, comparative examples, etc., nanostructures were prepared by the method for preparing a transition metal-doped nickel phosphide nanostructure according to the present disclosure while varying the 11 conditions described above, and catalysts for hydrogen evolution reaction, catalysts for oxygen evolution reaction and electrochemical water decomposition devices were prepared therefrom. Then, hydrogen evolution amount, hydrogen evolution rate, oxygen evolution amount and oxygen evolution rate were measured under alkaline electrolyte conditions by using them.

As a result, it was confirmed that electrochemical stability and durability were superior and high amount and rate of evolution of hydrogen or oxygen were maintained for a long time as compared to the existing precious metal catalysts or non-precious metal catalysts when all of the following conditions were satisfied.

(1) The substrate is nickel foam. (2) The zinc precursor is $Zn(NO_3)_2$. (3) The hydroxide is ammonium hydroxide ($NH_4OH$). (4) The zinc oxide nanostructure is grown by hydrothermal synthesis at 90-100° C. for 6-8 hours. (5) The nickel precursor is $NiCl_2$. (6) The transition metal precursor is $Mo_2Cl_{10}$ or $FeCl_3$. (7) In the conversion to the transition metal-doped nickel oxide nanostructure, the primary heat treatment is performed by cation exchange at 590-610° C. for 0.5-1 hour. (8) The phosphorus precursor is sodium hypophosphite ($NaPO_2H_2 \cdot H_2O$). (9) In the preparation of the transition metal-doped nickel phosphide nanostructure, phosphorization is achieved by performing the secondary heat treatment at 430-470° C. for 1-2 hours. (10) The doping amount of the transition metal in the transition metal-doped nickel phosphide nanostructure is 7-16 wt % based on 100 wt % of the nickel phosphide nanostructure. (11) The nickel phosphide nanostructure has an interplanar distance (d-spacing) of 0.21-0.24 nm as measured by X-ray diffractometry.

When any of the above 11 conditions was not satisfied, electrochemical stability or durability decreased rapidly with the progress of reaction time. The amount and rate of evolution of hydrogen or oxygen were similar to or lower than those of the conventional precious metal catalysts and non-precious metal catalysts.

Hereinafter, the present disclosure is described more specifically through examples. However, the present disclosure is not limited by the examples.

Example 1: Preparation of NiMoP/NF Nanowire (1) Preparation of Zinc Oxide/Nickel Foam Nanowire (ZnO/NF Nanowire)

After adding 0.3 g of $Zn(NO_3)_2$ and 2 g of ammonium hydroxide ($NH_4OH$) to 0.6 g of nickel foam (Ni foam, NF) and conducting hydrothermal synthesis at 95° C. for 8 hours, a zinc oxide/nickel foam nanowire (ZnO/NF nanowire) wherein zinc oxide grew on the nickel foam vertically in the form of a nanowire was prepared by allowing to cool spontaneously.

(2) Preparation of Mo-Doped Nickel Molybdenum Oxide/Nickel Foam Nanowire (NiMoO/NF Nanowire)

After adding 1 g of $NiCl_2$ and 0.1 g of $Mo_2Cl_{10}$ to 0.6 g of the zinc oxide/nickel foam nanowire (ZnO/NF nanowire), zinc oxide was converted to nickel oxide by cation exchange by conducting primary heat treatment at 600° C. for 0.5 hour and a Mo-doped nickel molybdenum oxide/nickel foam nanowire (NiMoO/NF nanowire) was prepared.

(3) Preparation of Mo-Doped Nickel Molybdenum Phosphide/Nickel Foam Nanowire (NiMoP/NF Nanowire)

After adding 1 g of $NaH_2PO_4 \cdot 2H_2O$ to 0.6 g of the NiMoO/NF nanowire, the Mo-doped NiMoO/NF nanowire was converted to a Mo-doped $Ni_2P$/NF nanowire by phosphorization by conducting secondary heat treatment at 450° C. for 2 hours.

Example 2: Preparation of NiFeP/NF Nanowire

A NiFeP/NF nanowire was prepared in the same manner as in Example 1 except that $FeCl_3$ was added instead of $Mo_2Cl_{10}$.

Example 3: Preparation of NiVP/NF Nanowire

A NiVP/NF nanowire was prepared in the same manner as in Example 1 except that $VCl_3$ was added instead of $Mo_2Cl_{10}$.

Example 4: Preparation of NiCoP/NF Nanowire

A NiCoP/NF nanowire was prepared in the same manner as in Example 1 except that $CoCl_2$ was added instead of $Mo_2Cl_{10}$.

Comparative Example 1: Preparation of $Ni_2P$/NF Nanowire

A $Ni_2P$/NF nanowire was prepared in the same manner as in Example 1 except that $Mo_2Cl_{10}$ was added.

Comparative Example 2: Preparation of $IrO_2$/NF $IrO_2$/NF was prepared by depositing an $IrO_2$ precursor on nickel foam (NF) through sputtering at 100 W power for 5 minutes.

Comparative Example 3: Preparation of Pt/NF

Pt/NF was prepared by depositing a Pt precursor on nickel foam (NF) through sputtering at 100 W power for 5 minutes.

Test Example 1: XRD and SEM Analysis

The morphology, crystal structure and elemental composition of the NiMP/NF nanowires (M=Mo, Fe, V or Co) prepared in Examples 1-4 and Comparative Example 1 were analyzed by scanning electron microscopy (SEM) and X-ray diffractometry (XRD). The result is shown in FIGS. 2 and 3.

Figure 2A:
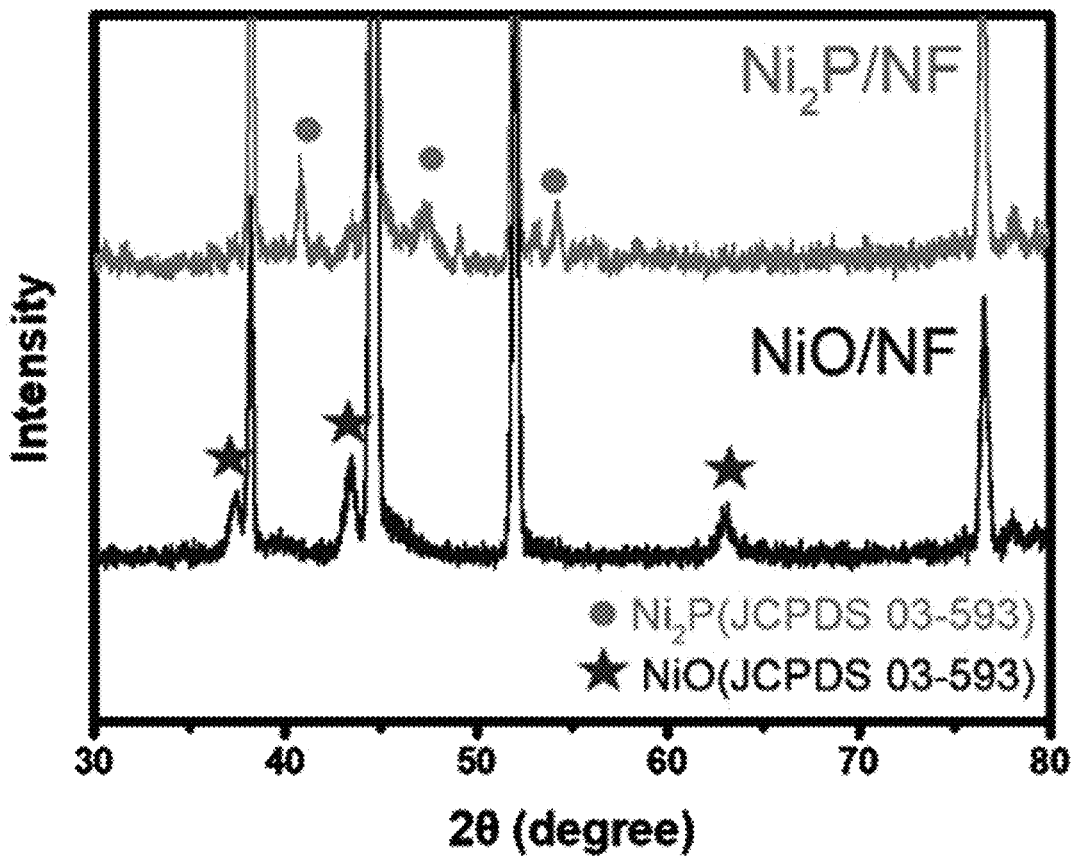
FIGS. 2A to 2C show the XRD patterns of a NiO/NF nanowire and a $Ni_2P$/NF nanowire prepared in Comparative Example 1 (FIG. 2A) and the SEM images of the NiO/NF nanowire (FIG. 2B) and the $Ni_2P$/NF nanowire (FIG. 2C).
Figure 2B:
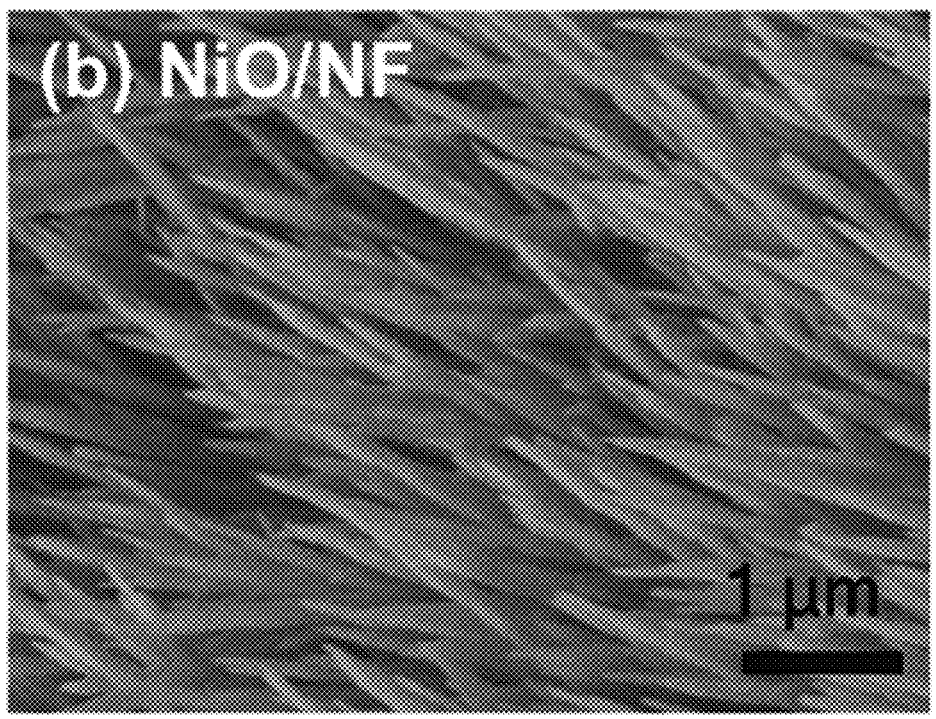
Figure 2C:
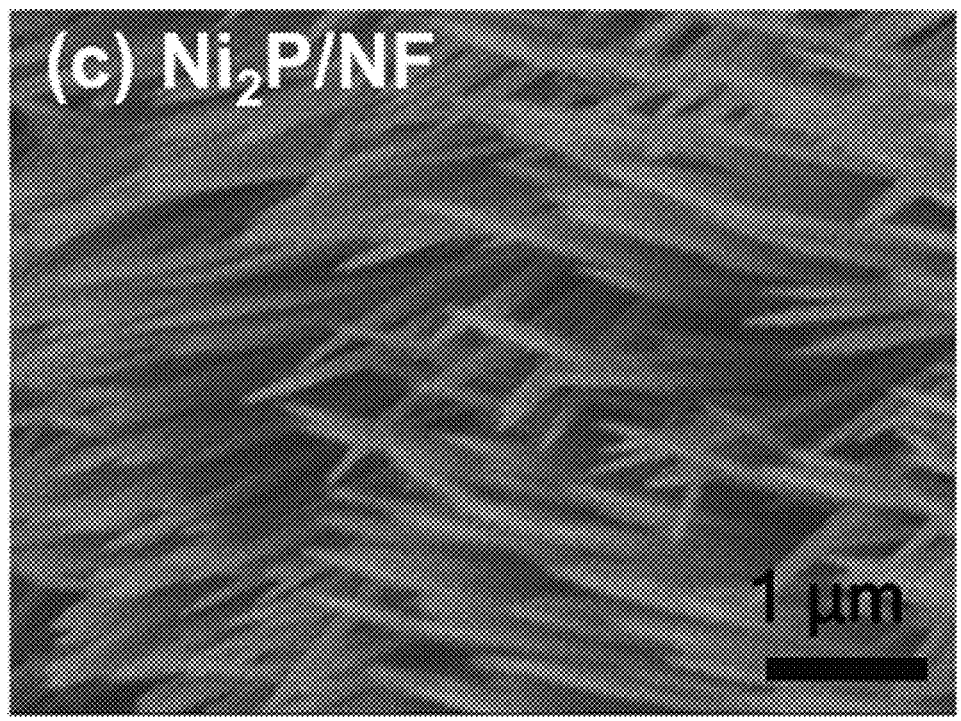

FIGS. 2A to 2C show the XRD patterns of the NiO/NF nanowire and the $Ni_2P$/NF nanowire prepared in Comparative Example 1 (a) and the SEM images of the NiO/NF nanowire (b) and the $Ni_2P$/NF nanowire (c). Referring to FIG. 2, the ZnO peak disappeared completely and the NiO peak was observed newly after the cation exchange of Ni. This means that ZnO was successfully converted to NiO. In addition, the Ni background peak was observed in all the XRD patterns because it originates from the Ni foam substrate. In addition, after the phosphorization, the $Ni_2P$ peak was detected but the NiO peak was not observed in the XRD pattern any more, as shown in FIG. 2A. For NiMP (M=Fe, Mo, V or Co), a pattern similar to that of $Ni_2P$ was observed due to relatively low doping concentration.

Figure 3A:
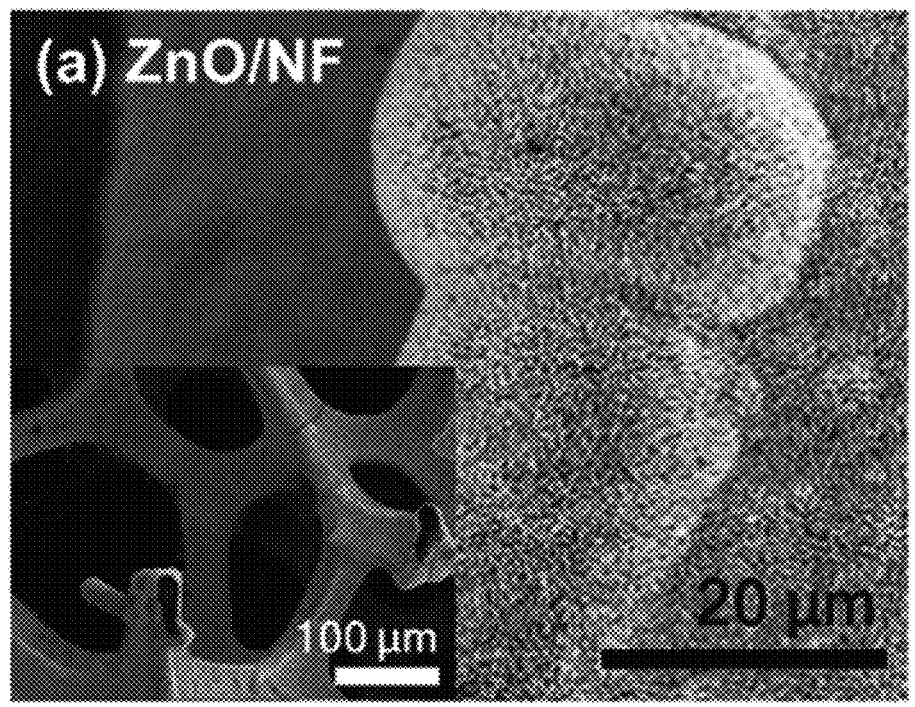
FIGS. 3A to 3G show the SEM images of a ZnO/NF nanowire (FIGS. 3A and 3B), a NiFeO/NF nanowire (FIG. 3C), a NiMoO/NF nanowire (FIG. 3D), a NiFeP/NF nanowire (FIG. 3E) and a NiMoP/NF nanowire (FIG. 3F) prepared in Examples 1 and 2 and their XRD patterns (FIG. 3G).
Figure 3B:
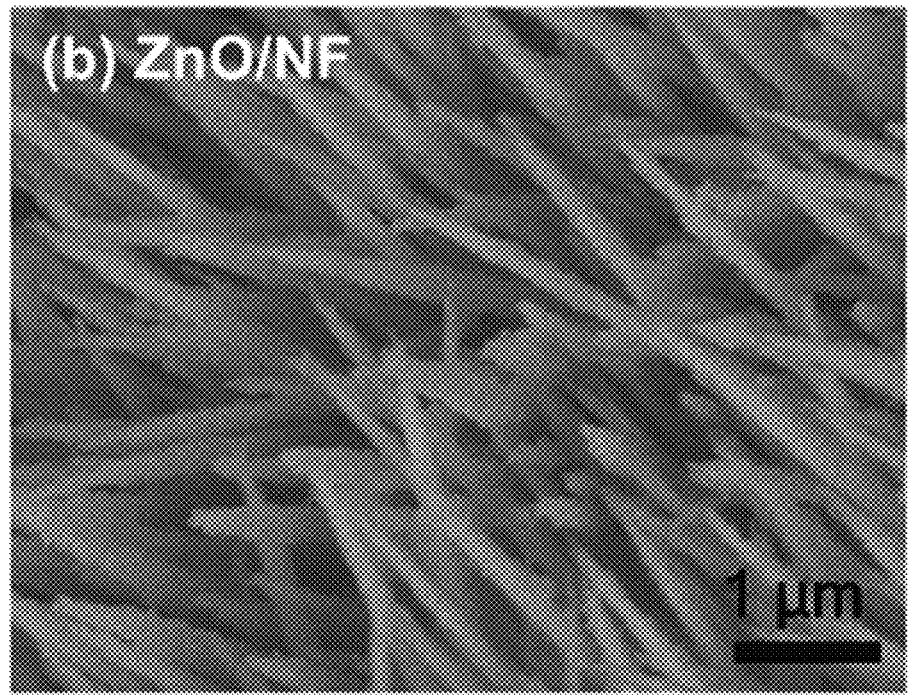
Figure 3C:
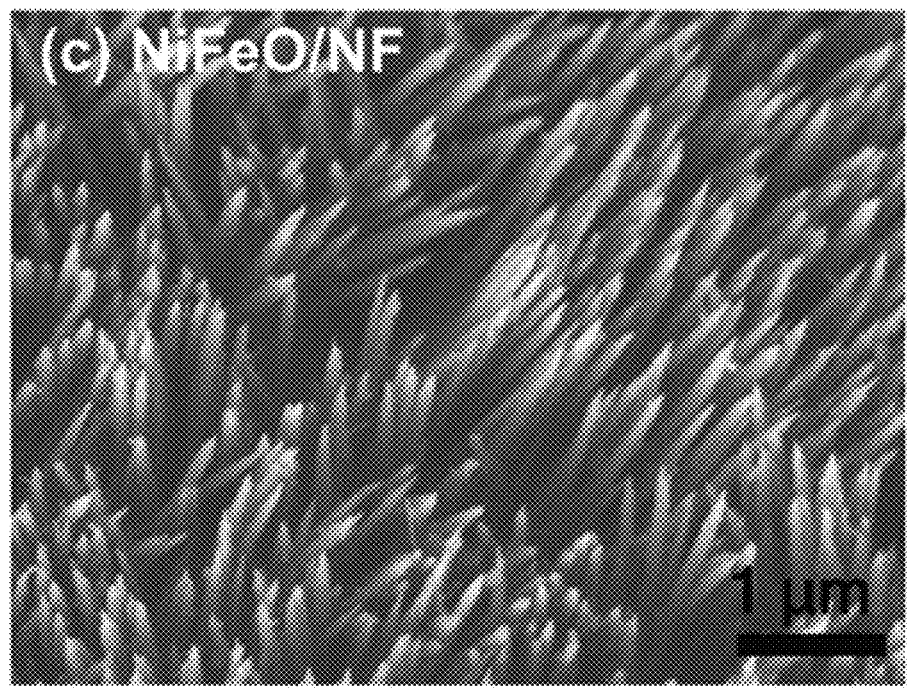
Figure 3D:
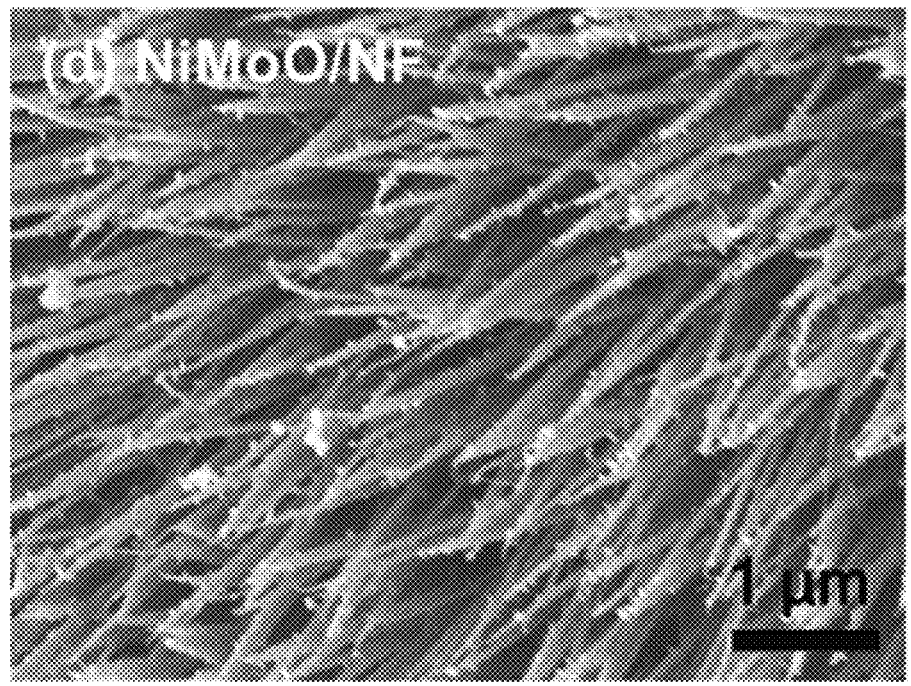
Figure 3E:
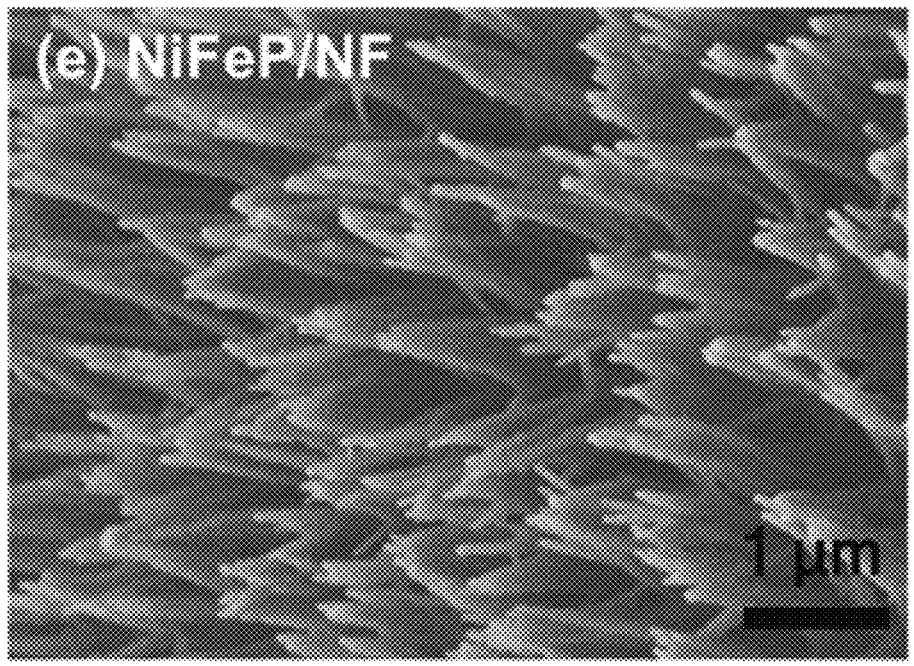
Figure 3F:
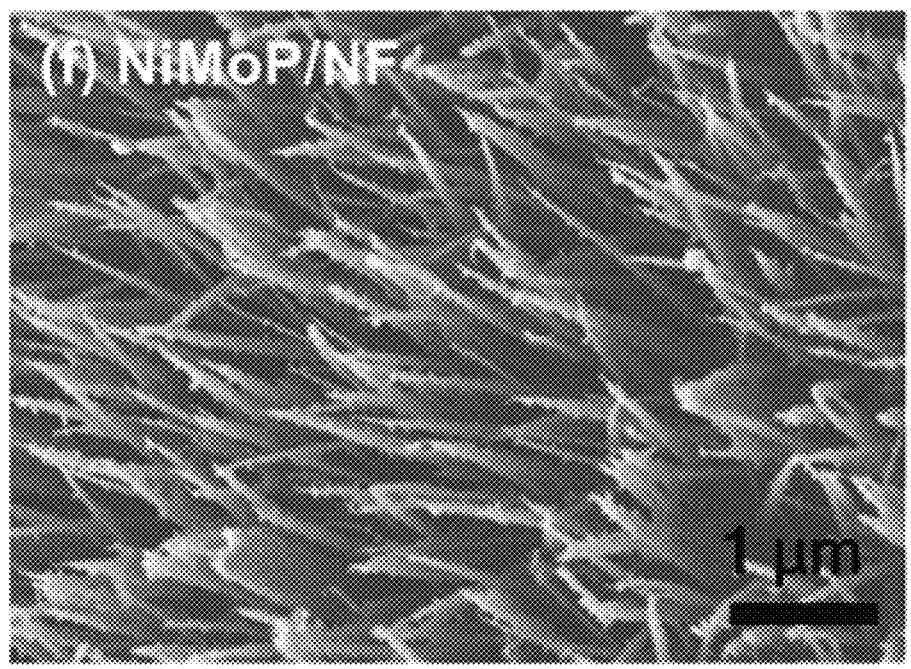
Figure 3G:
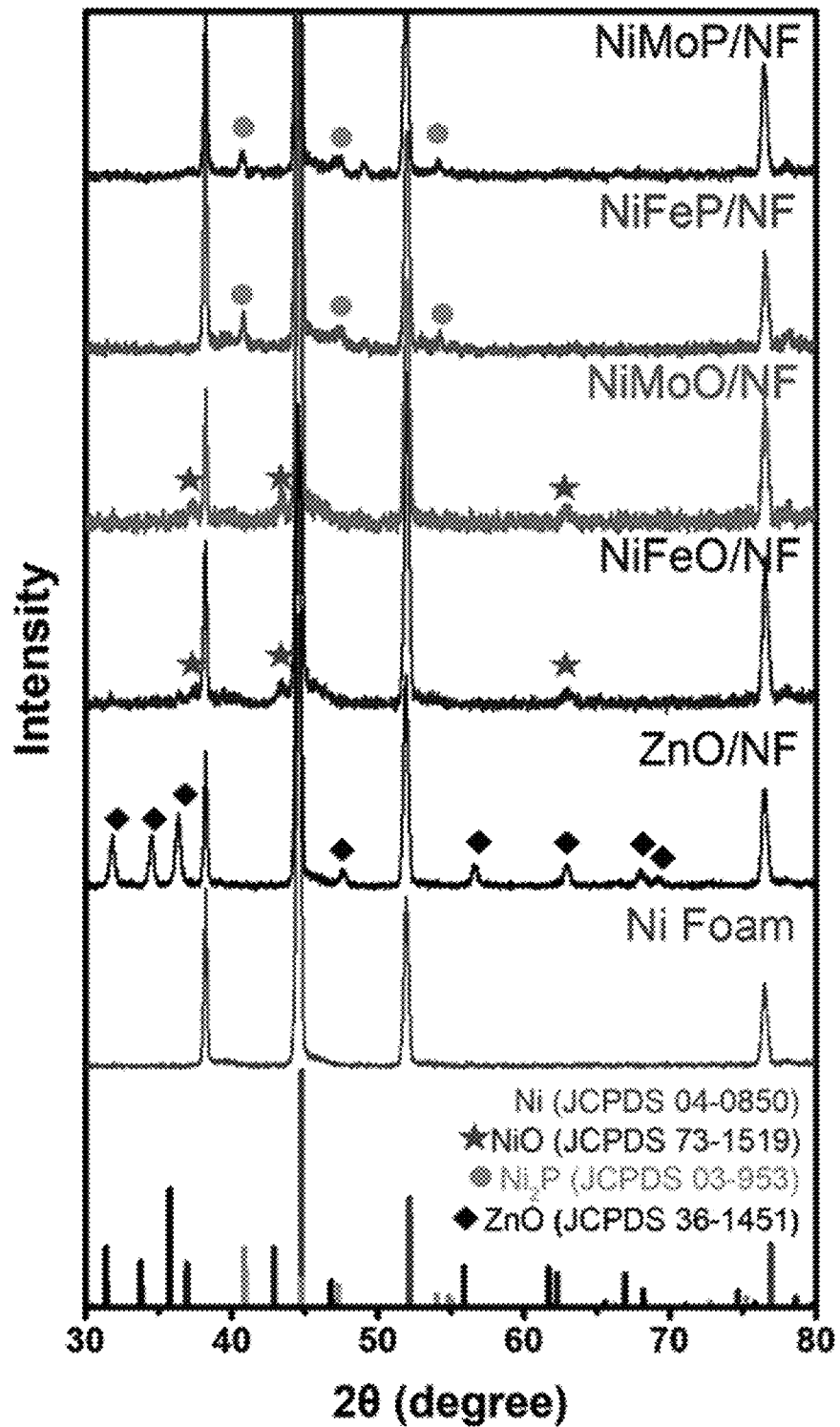
Figure 4A:
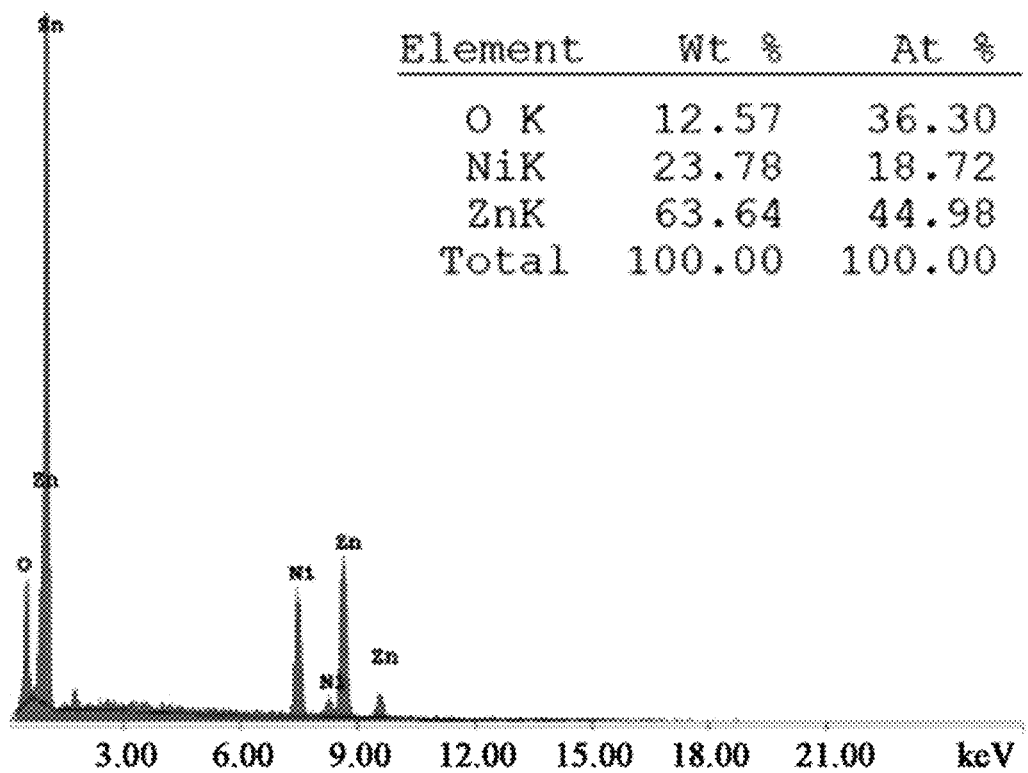
FIGS. 4A to 4F show the elemental composition analysis result of a ZnO/NF nanowire (FIG. 4A), a $Ni_2P$/NF nanowire (FIG. 4B), NiVP/NF (FIG. 4C), NiCoP/NF (FIG. 4D), NiFeP/NF (FIG. 4E) and NiMoP/NF (FIG. 4F) prepared in Examples 1-4 and Comparative Example 1 by EDS.
Figure 4B:
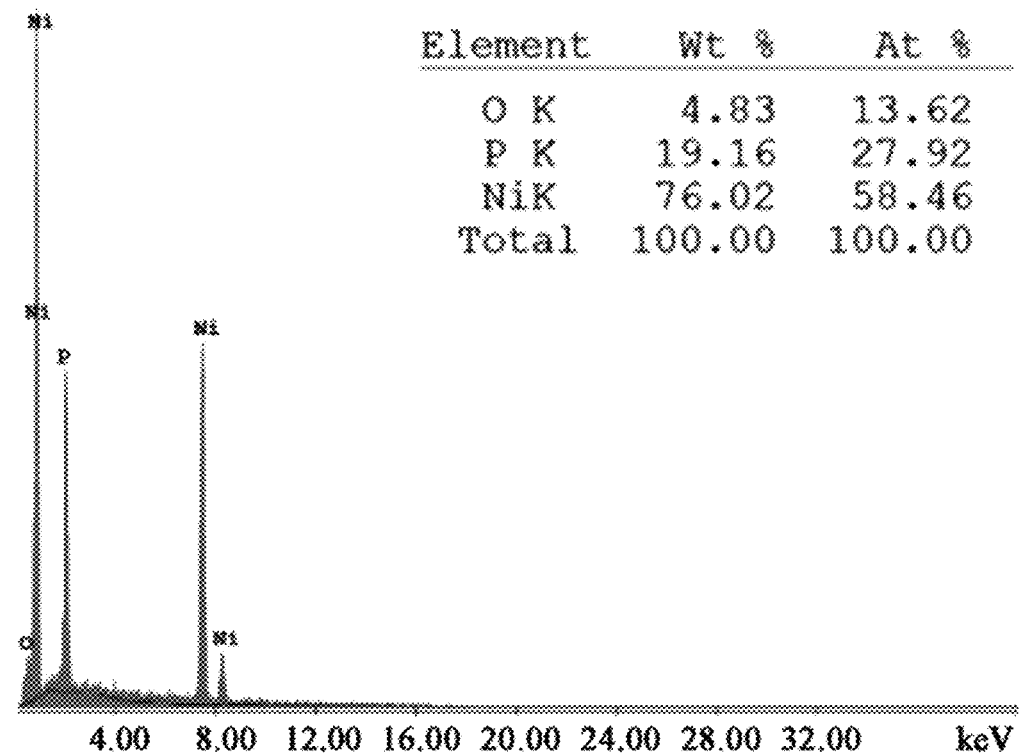
Figure 4C:
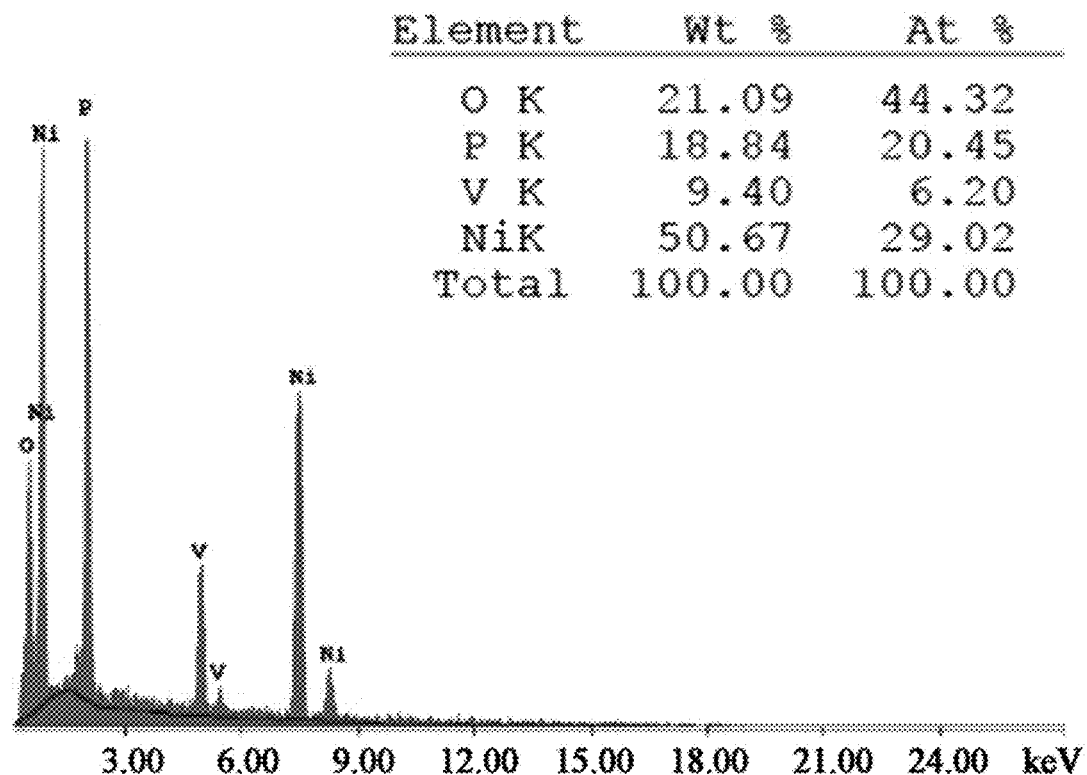
Figure 4D:
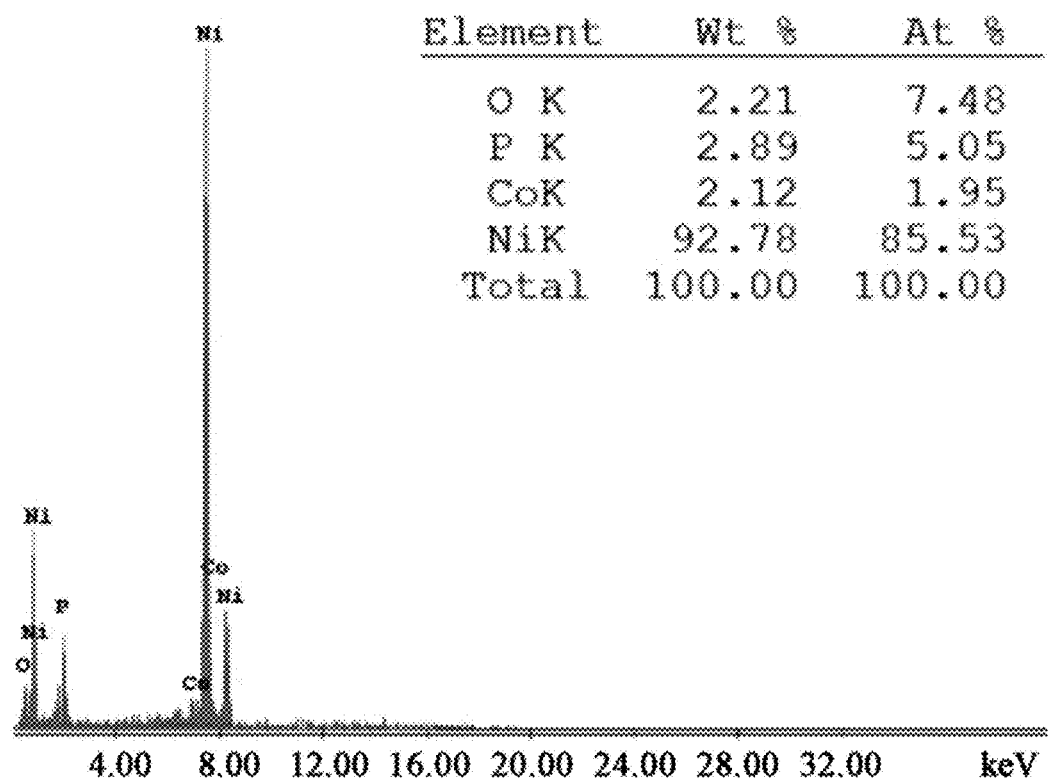
Figure 4E:
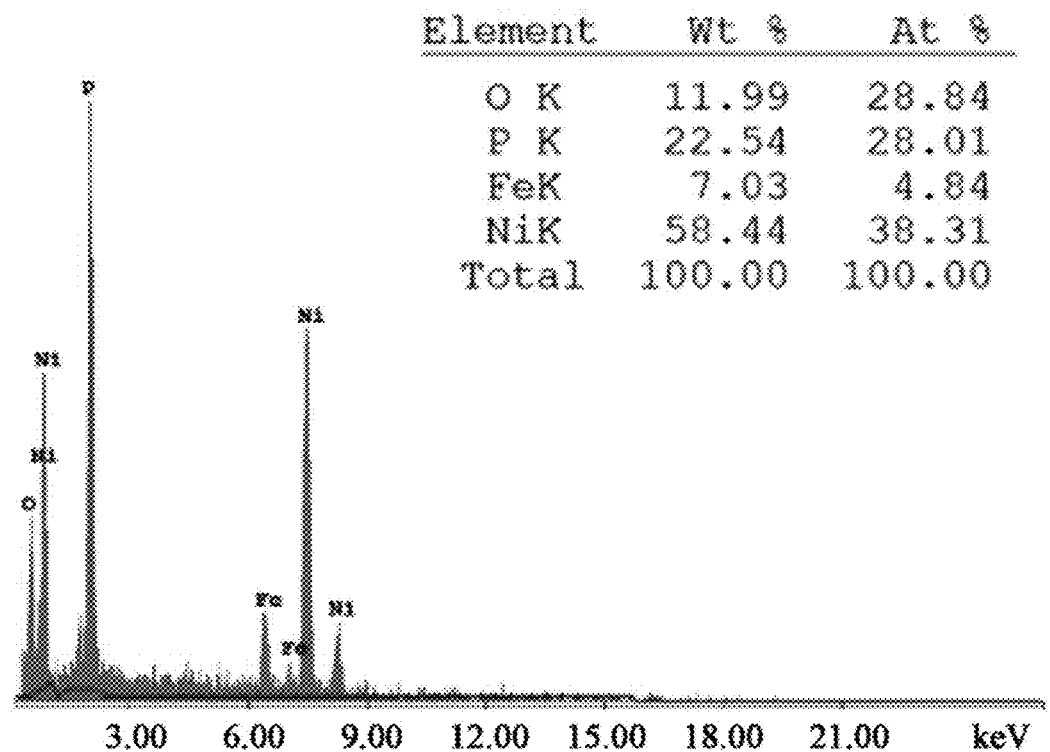
Figure 4F:
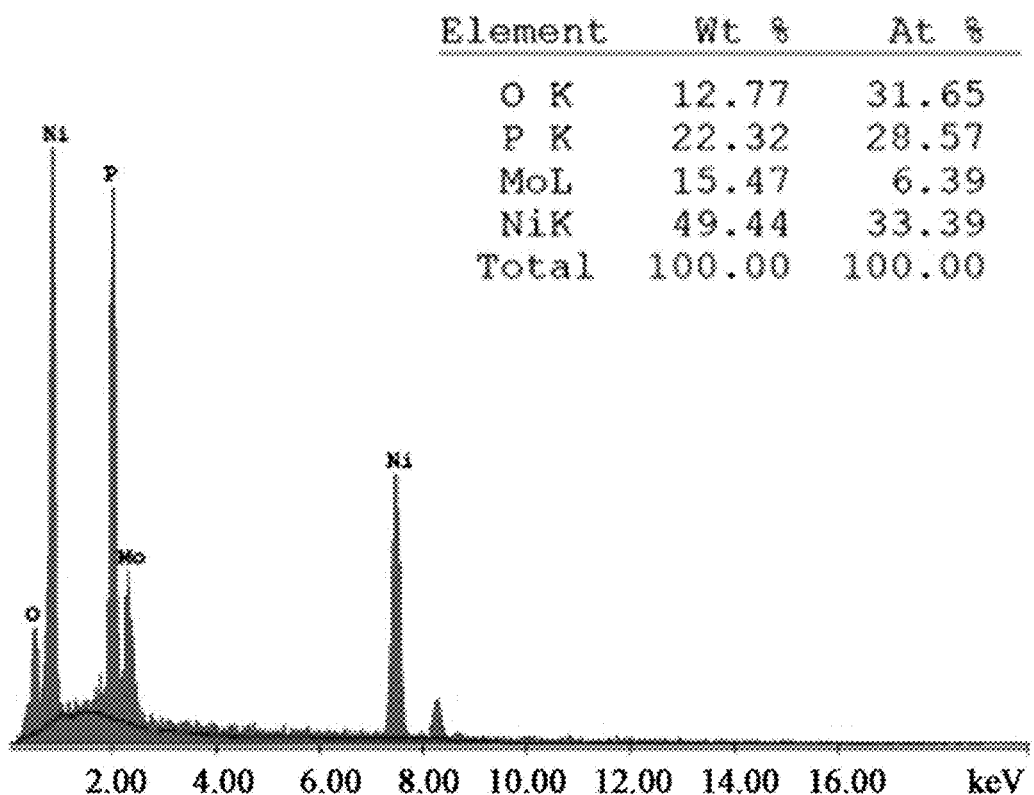

FIGS. 3A to 3G shows the SEM images of the ZnO/NF nanowire (FIGS. 3A and 3B), the NiFeO/NF nanowire (FIG. 3C), the NiMoO/NF nanowire (FIG. 3D), the NiFeP/NF nanowire (FIG. 3E) and the NiMoP/NF nanowire (FIG. 3F) prepared in Examples 1 and 2 and their XRD patterns (FIG. 3G). Referring to FIGS. 3A to 3G, it was found out that, in the ZnO/NF nanowire (FIGS. 3A and 3B), the ZnO NW layer formed vertically by hydrothermal synthesis was covering the Ni Foam densely. The ZnO NW had an average diameter of 100 nm and a length of 1 μm.

In addition, it was found out that, in the NiFeO/NF nanowire (FIG. 3C) and the NiMoO/NF nanowire (FIG. 3D), the color of the ZnO NW was changed from ivory to light orange after the Ni cation exchange and the formed NiO maintained a NW (nanowire) structure. In addition, it was confirmed that NiFeO and NiMoO were formed as Fe and Mo metals were doped in NiO, respectively.

In addition, it was found out that, in the NiFeP/NF nanowire (FIG. 3E) and the NiMoP/NF nanowire (FIG. 3F), black $Ni_2P$ NW maintaining a high-density NW (nanowire) structure was formed through phosphorization of the NiO NW, and NiFeP and NiMoP were formed as Fe and Mo metals were doped, respectively. It was confirmed that the NiMoO/NF nanowire (FIG. 3D) and the NiMoP/NF nanowire (FIG. 3F) had slightly rough NW surface as compared to the NiFeP/NF nanowire (FIG. 3E).

Meanwhile, referring to FIG. 3G, it was confirmed that the ZnO NW formed on the Ni-foam substrate had a wurtzite crystal structure. NiO peaks were observed in the NiFeO/NF nanowire and the NiMoO/NF nanowire, and $Ni_2P$ peaks observed in the NiFeP/NF nanowire and the NiMoP/NF nanowire.

Test Example 2: EDS and TEM Analysis

In order to investigate the crystal structure and presence of metal dopants, the NiMP/NF nanowires (M=Mo, Fe, V or Co) prepared in Examples 1-4 and Comparative Example 1 were analyzed by EDS, low-resolution TEM (LRTEM), transmission electron microscopy (TEM) and electron energy loss spectroscopy (EELS). The result is shown in FIGS. 4 and 5.

FIGS. 4A to 4F shows the elemental composition analysis result of the ZnO/NF nanowire (FIG. 4A), the $Ni_2P$/NF nanowire (FIG. 4B), the NiVP/NF (FIG. 4C), the NiCoP/NF (FIG. 4D), the NiFeP/NF (FIG. 4E) and the NiMoP/NF (FIG. 4F) prepared in Examples 1-4 and Comparative Example 1 by EDS. Referring to FIGS. 4A to 4F, the Ni:M ratio in the NiMP was 1.0:0.1 (NiFeP, M=Fe), 1.0:0.3 (NiMoP, M=Mo), 1.0:0.02 (NiCoP, M=Co) and 1.0:0.2 (NiVP, M=V), respectively.

Figure 5A:
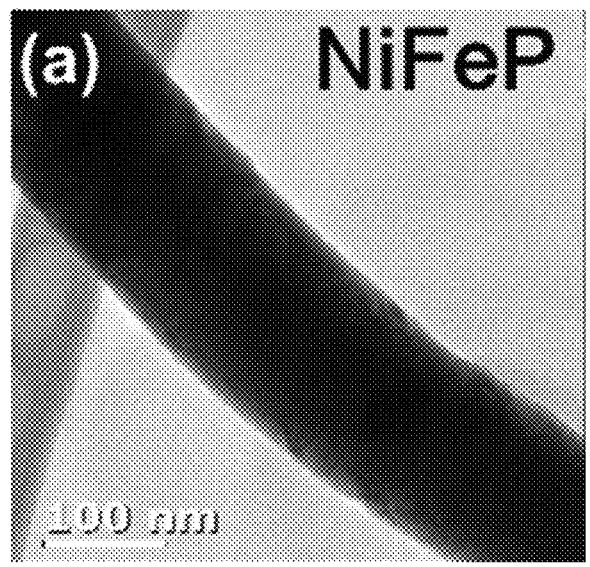
FIGS. 5A to 5J show the low-resolution TEM images (FIGS. 5A and 5F), EELS results (FIGS. 5B, 5C, 5D, 5G, 5H, and 5I) and high-resolution TEM images (FIGS. 5E and 5J) of a NiFeP/NF nanowire and a NiMoP/NF nanowire prepared in Examples 1 and 2.
Figure 5B:
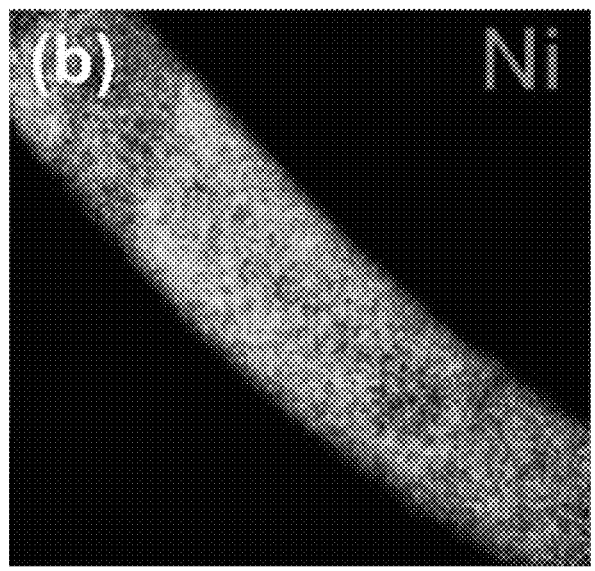
Figure 5C:
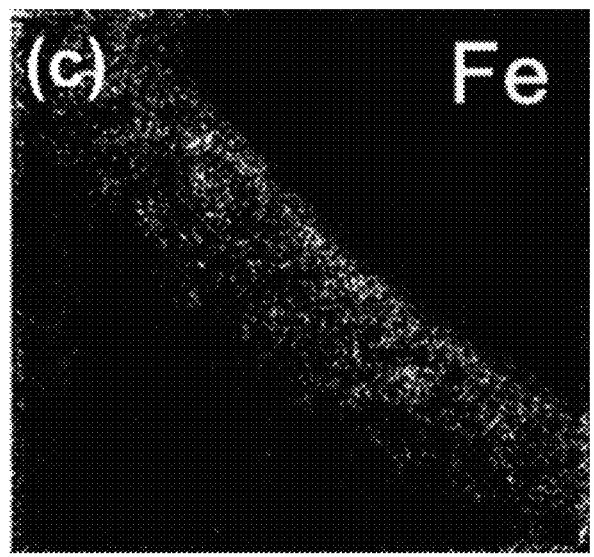
Figure 5D:
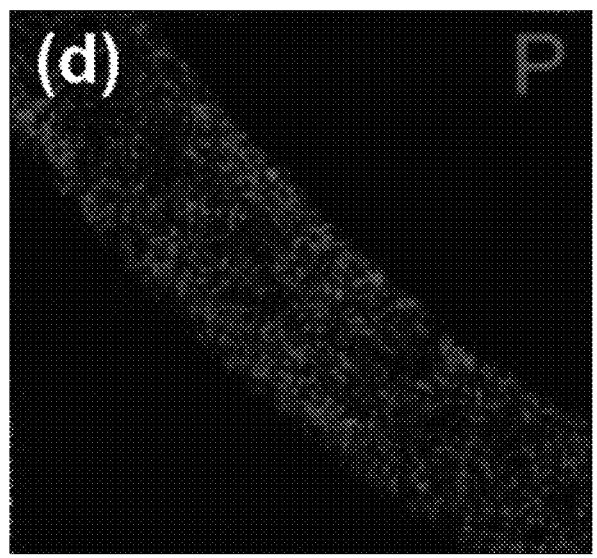
Figure 5E:
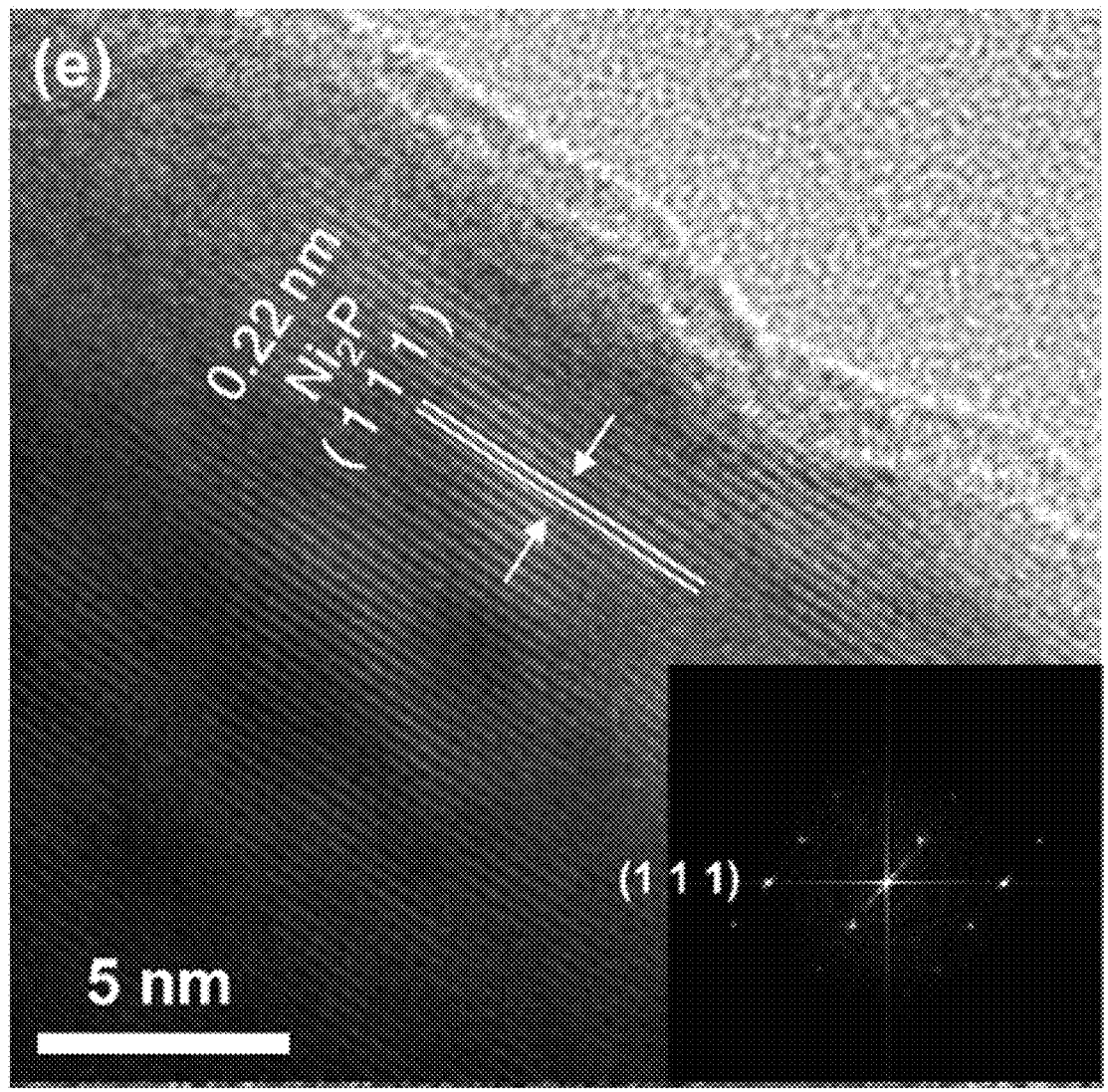
Figure 5F:
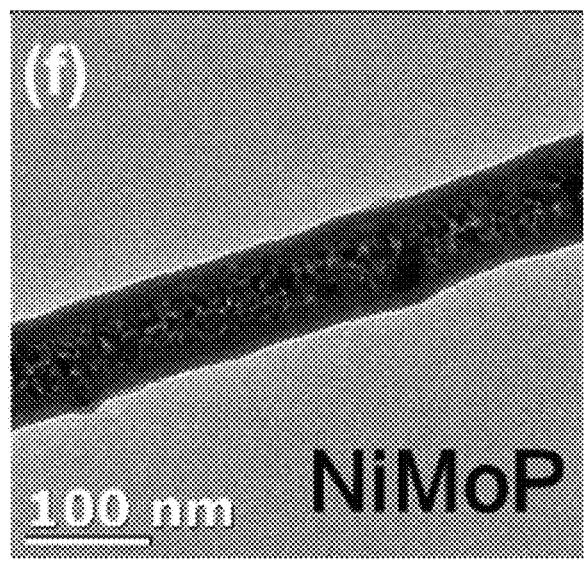
Figure 5G:
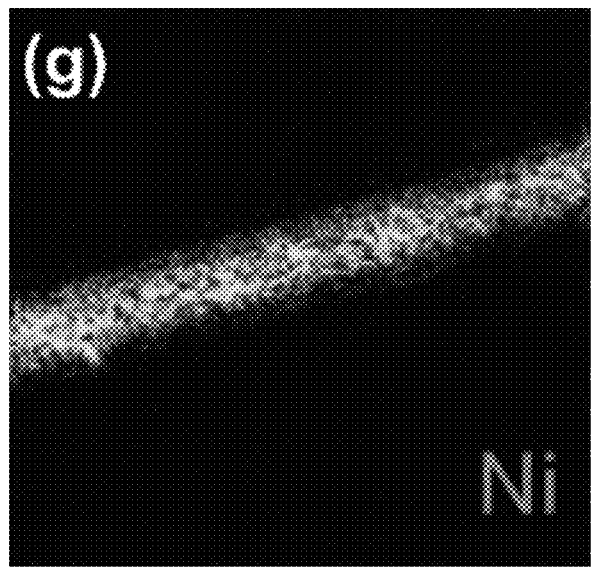
Figure 5H:
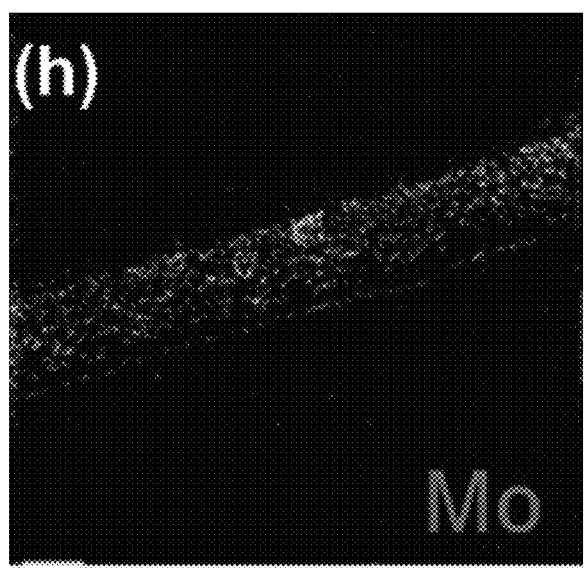
Figure 5I:
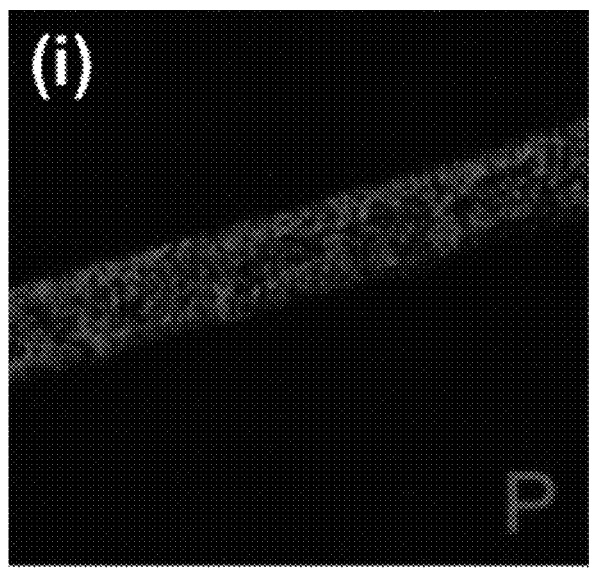
Figure 5J:
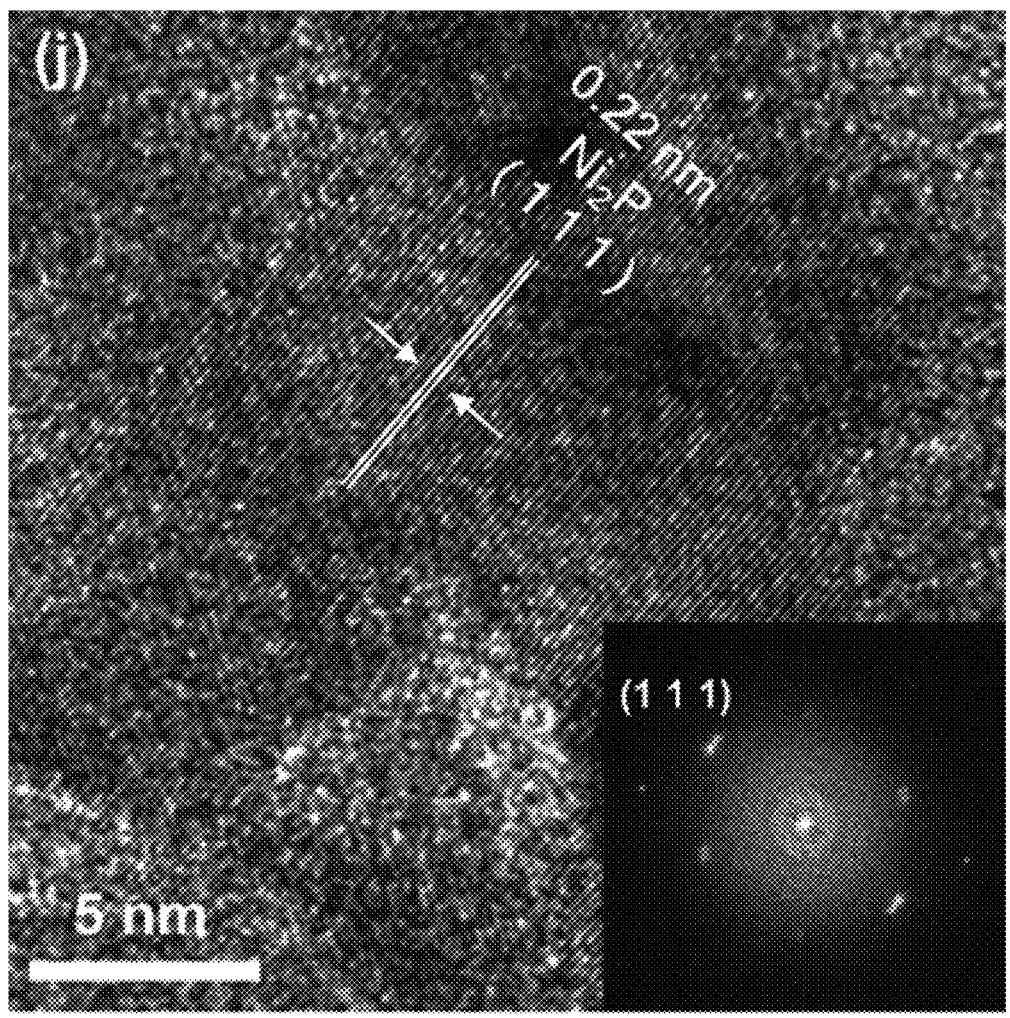

FIGS. 5A to 5J show the low-resolution TEM images (FIGS. 5A and 5F), EELS results (FIGS. 5B, 5C, 5D, 5G, 5H, and 5I) and high-resolution TEM images (FIGS. 5E and 5J) of the NiFeP/NF nanowire and the NiMoP/NF nanowire prepared in Examples 1 and 2. Referring to FIGS. 5A and 5F, the low-resolution TEM (LRTEM) images show that the two samples have typical NW structures with a diameter of about 100 nm, which suggests that there was no rapid change in the overall morphology of the ZnO NW during cation exchange and phosphorization. In addition, FIGS. 5B, 5C, 5D, 5G, 5H, and 5I show that the corresponding elements are distributed well in the NiFeP and NiMoP NWs.

In addition, FIG. 5E shows that NiFeP has high crystallinity. The $Ni_2P$ had a lattice distance of 0.22 nm in the (111) plane, and the inserted diffraction pattern (DP) shows the single crystalline characteristic of the NiFeP NW. It was confirmed that low Fe dopant concentration had no significant effect on the crystal lattice structure of $Ni_2P$ as already observed in the XRD result. In contrast, as can be seen from the HRTEM image and DP in FIG. 5J, the NiMoP NW showed polycrystalline structure. It was confirmed that the relatively nonuniform and polycrystalline characteristic of NiMoP is due to lattice mismatch.

That is to say, for NiFeO, lattice mismatch hardly occurred (~3%) during the synthesis of FeO and NiO because both NiO and FeO have a cubic structure with the lattice parameter a=0.4177 and 0.4304 nm, respectively. This is the reason why NiFeO and NiFeP have single crystalline characteristics. In contrast, $MoO_2$ has much larger lattice parameters as a=0.562, b=0.486 and c=0.563 nm as compared to NiO, and this results in lattice mismatch (16-35%) in NiMoO and NiMoP.

Test Example 3-1: Analysis of Performance of Catalyst for Oxygen Evolution Reaction OER activity was measured under an alkaline pH condition of 1.0 M KOH using the NiMP/NF nanowires (M=Mo, Fe, V or Co) prepared in Examples 1-4 and Comparative Examples 1-2 as catalysts for oxygen evolution reaction. NF, $Ni_2P$, NiMP (M=Fe, Mo, V, Co) and a standard precious metal electrode (Pt or $IrO_2$) were tested using a three-electrode system for comparison of the performance of the electrochemical catalysts. Graphite was used as a counter electrode and a saturated calomel electrode was used as a reference electrode. For accurate measurement of catalyst performance, all experimental results were referenced to a reversible hydrogen electrode. In addition, voltage drop due to ohmic resistance was corrected by iR compensation. The result is shown in FIGS. 6A to 6D.

FIGS. 6A to 6D show the (FIG. 6A) LSV curves and (FIG. 6B) Tafel slopes for oxygen evolution reaction for the NiMP/NF nanowires (M=Mo, Fe, V or Co) prepared in Examples 1-4 and Comparative Examples 1 and 2, (FIG. 6C) the voltage of NiFeP at 10 mA/$cm^2$ depending on time and SEM images before and after 60 hours of oxygen evolution reaction, and (FIG. 6D) the CV curves of NiFeP before and after 5000 cycles of cyclic voltammetry.

Figure 6A:
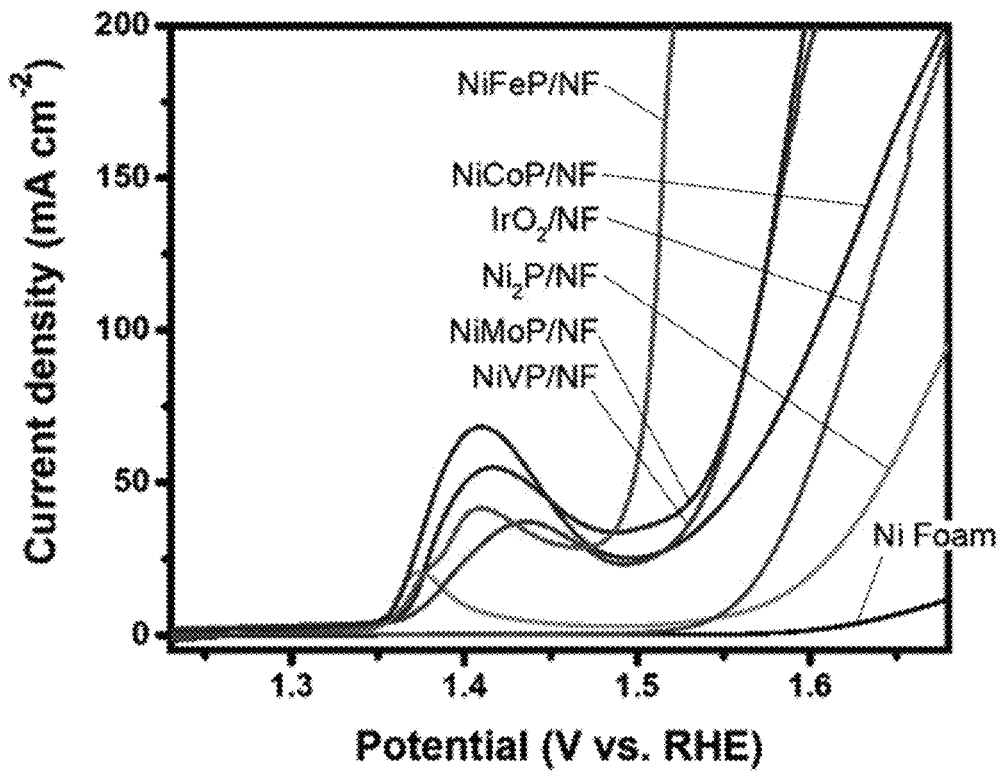
FIGS. 6A to 6D show the (FIG. 6A) LSV curves and (FIG. 6B) Tafel slopes for oxygen evolution reaction for NiMP/NF nanowires (M=Mo, Fe, V or Co) prepared in Examples 1-4 and Comparative Examples 1 and 2, (FIG. 6C) the voltage of NiFeP at 10 mA/cm² depending on time and SEM images before and after 60 hours of oxygen evolution reaction, and (FIG. 6D) the CV curves of NiFeP before and after 5000 cycles of cyclic voltammetry.

FIG. 6A shows the oxygen evolution curves obtained from LSV (linear sweep voltammetry) measurement. Distinct oxidation peaks were detected around 1.4 V for all the Ni-based catalysts. This is because the nanowire in the porous electrode has large surface area, which allows oxidation of many Ni(II)O atoms to Ni(III)OOH. When overvoltage was compared at a current density of 100 mA/cm$^2$ ($\eta_{100}$), the doped NiMP nanowires showed remarkably improved OER performance as compared to pristine Ni$_2$P. In particular, the NiFeP nanowire showed the lowest $\eta_{100}$ value of 279 mV, and other NiMoP, NiVP and NiCoP nanowires showed higher $\eta_{100}$ values as 337, 338 and 373 mV, respectively. In addition, the Ni$_2$P and IrO$_2$ nanowires showed overvoltage of 453 and 396 mV, respectively.

Figure 6B:
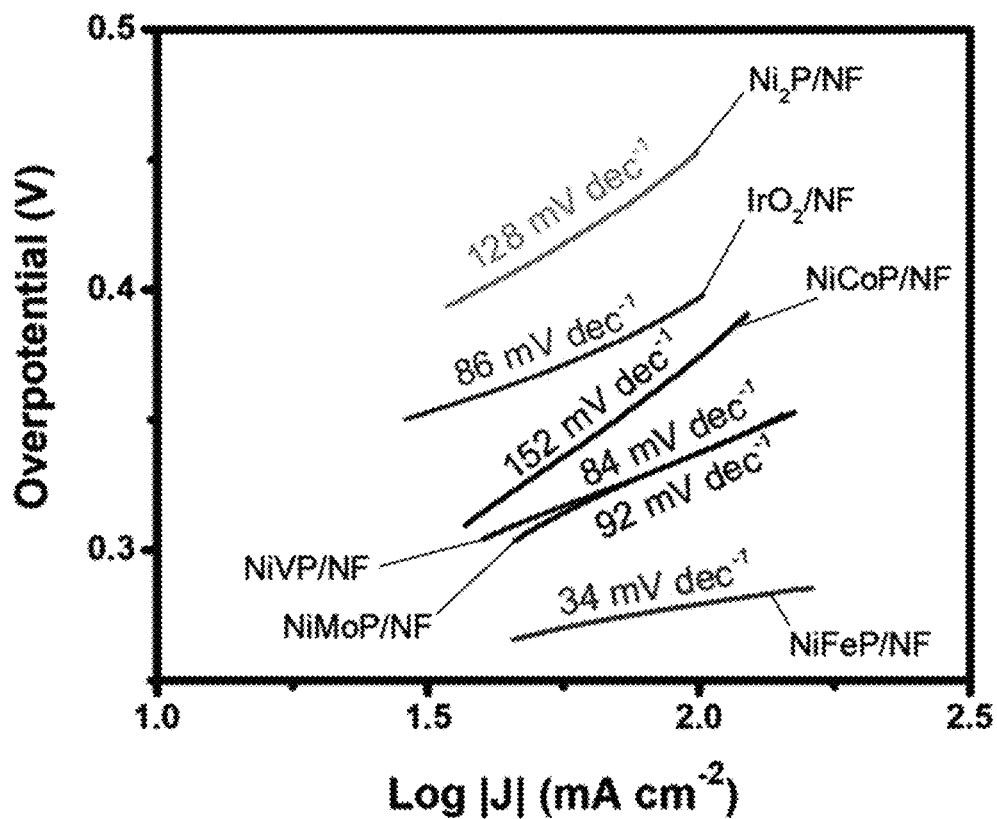

FIG. 6B shows the Tafel slopes for identifying the energy barrier of oxygen evolution reaction. The NiFeP nanowire showed the lowest slope as 34 mV/dec, which was significantly lower than that of the IrO$_2$ nanowire (86 mV/dec). Other NiMP and Ni$_2$P nanowires showed higher Tafel slopes than the IrO$_2$ nanowire. This indicates that the NiFeP is the most suitable catalyst for high-efficiency OER, which is because it is capable of providing many active sites and exhibiting fast kinetic activity.

Figure 6C:
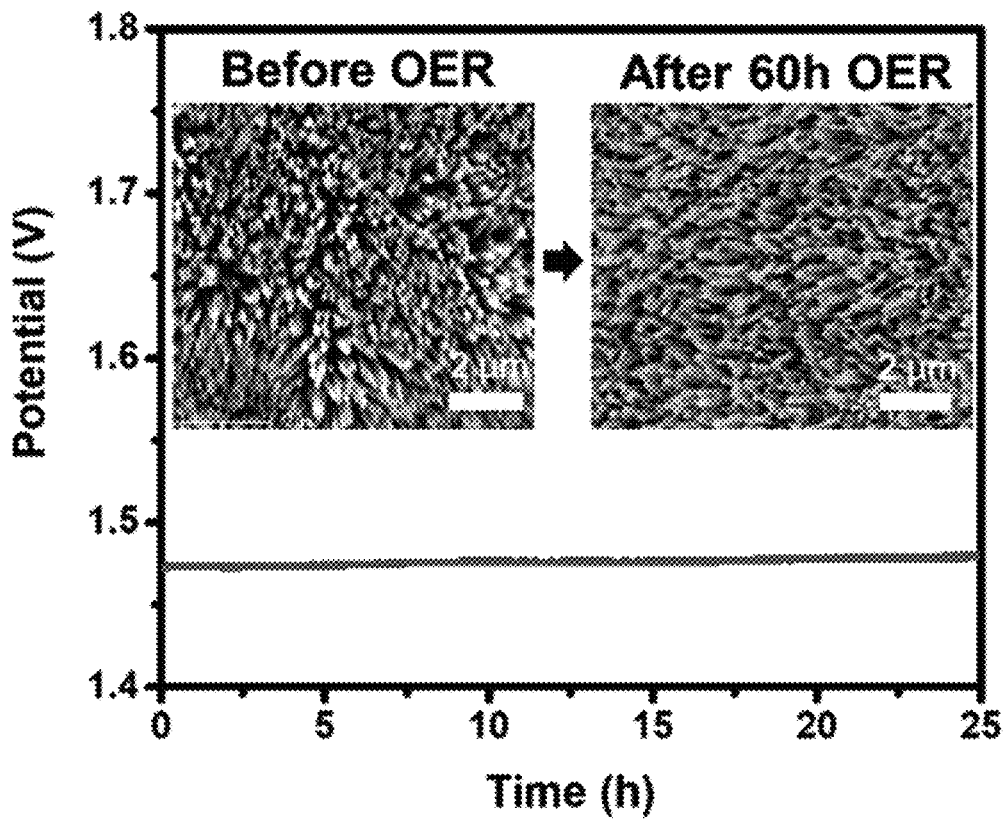
Figure 6D:
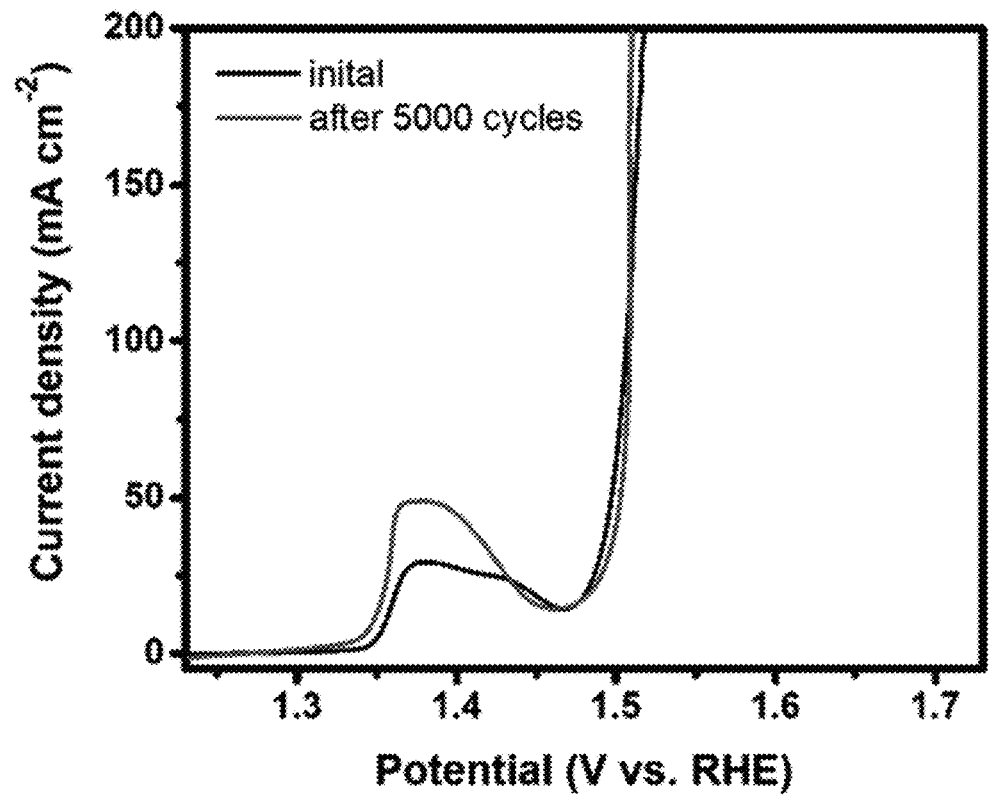

FIGS. 6C and 6D show the results of chronopotentiometry and cyclic voltammetry (CV) for identifying the OER stability of the NiFeP nanowire of Example 2. As can be seen from FIG. 6C, the initial overvoltage for attaining the current density of 10 mA/cm$^2$ was 242 mV, and the overvoltage was increased by 6 mV only after operation for 25 hours, which corresponds to only 2% of the initial value. FIG. 6D shows almost the same result except for the slightly increased oxidation peak after 5000 cycles. This result suggests that the NiFeP nanowire catalyst is stable under an alkaline OER condition.

Test Example 3-2: XPS Analysis

The NiFeP nanowire of Example 2 was analyzed by X-ray photoelectron spectroscopy (XPS) for investigation of chemical bonding. The result is shown in FIGS. 7A to 7C.

Figure 7A:
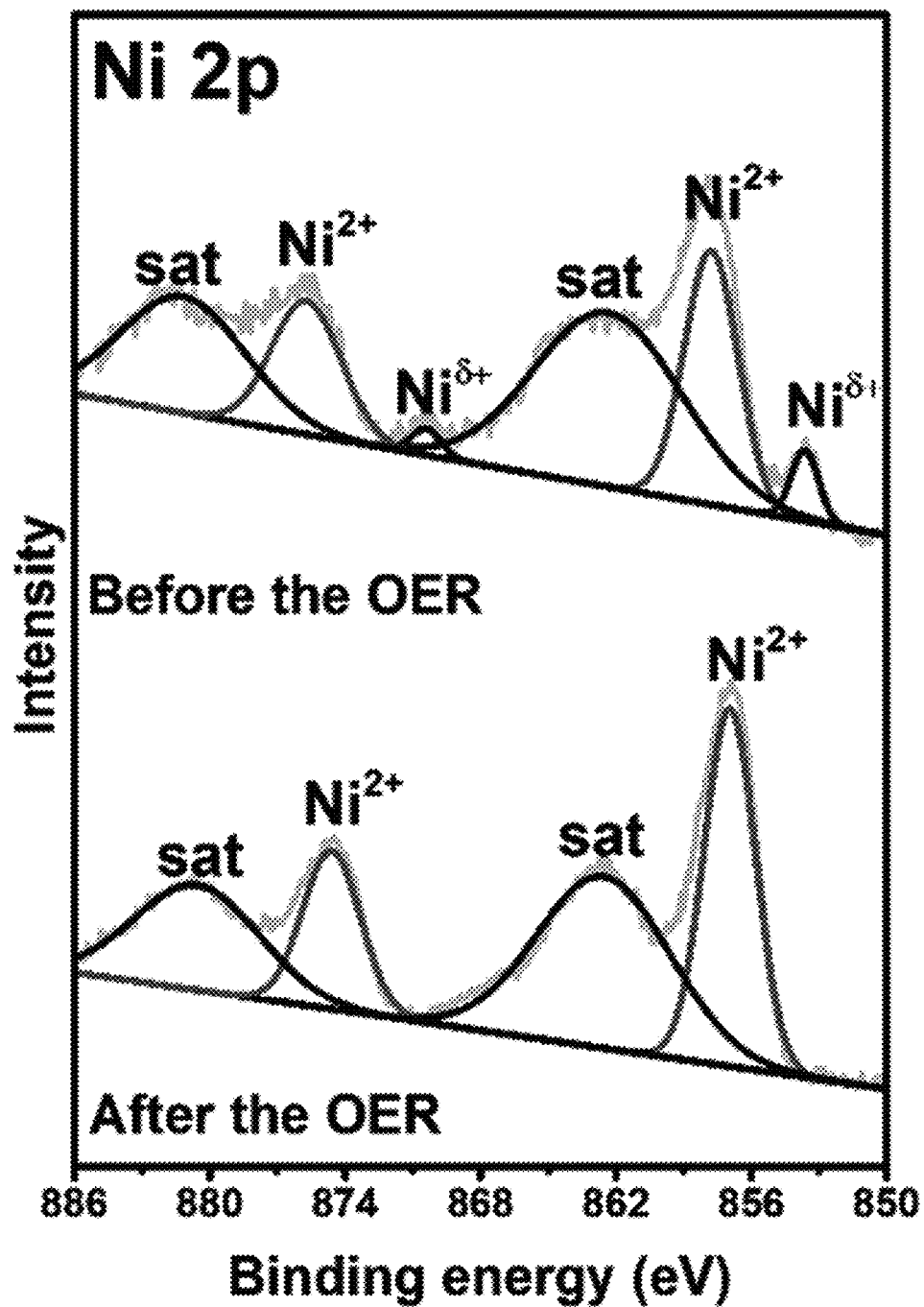
FIGS. 7A to 7C show the XPS analysis results of a NiFeP nanowire prepared in Example 2.
Figure 7B:
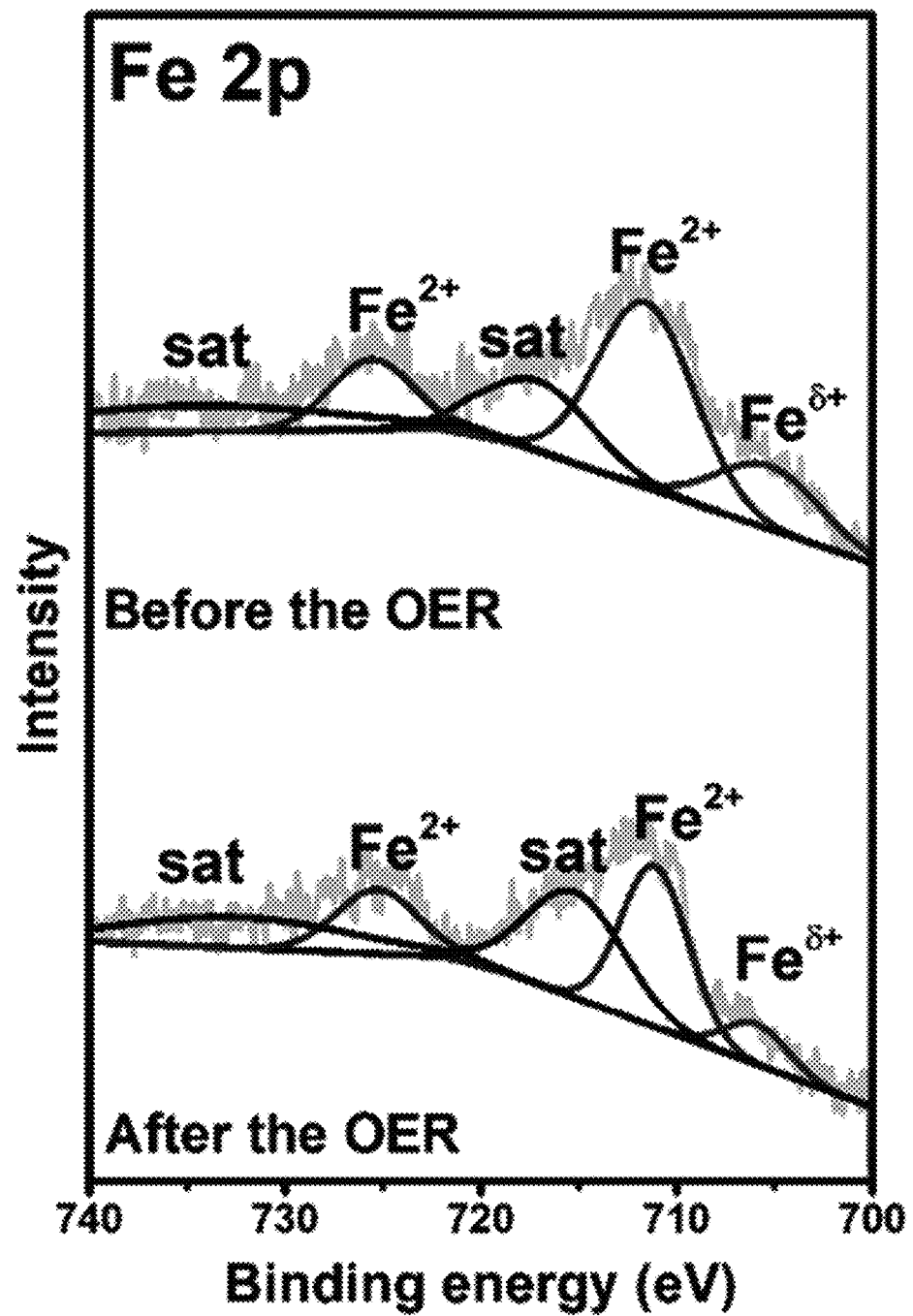
Figure 7C:
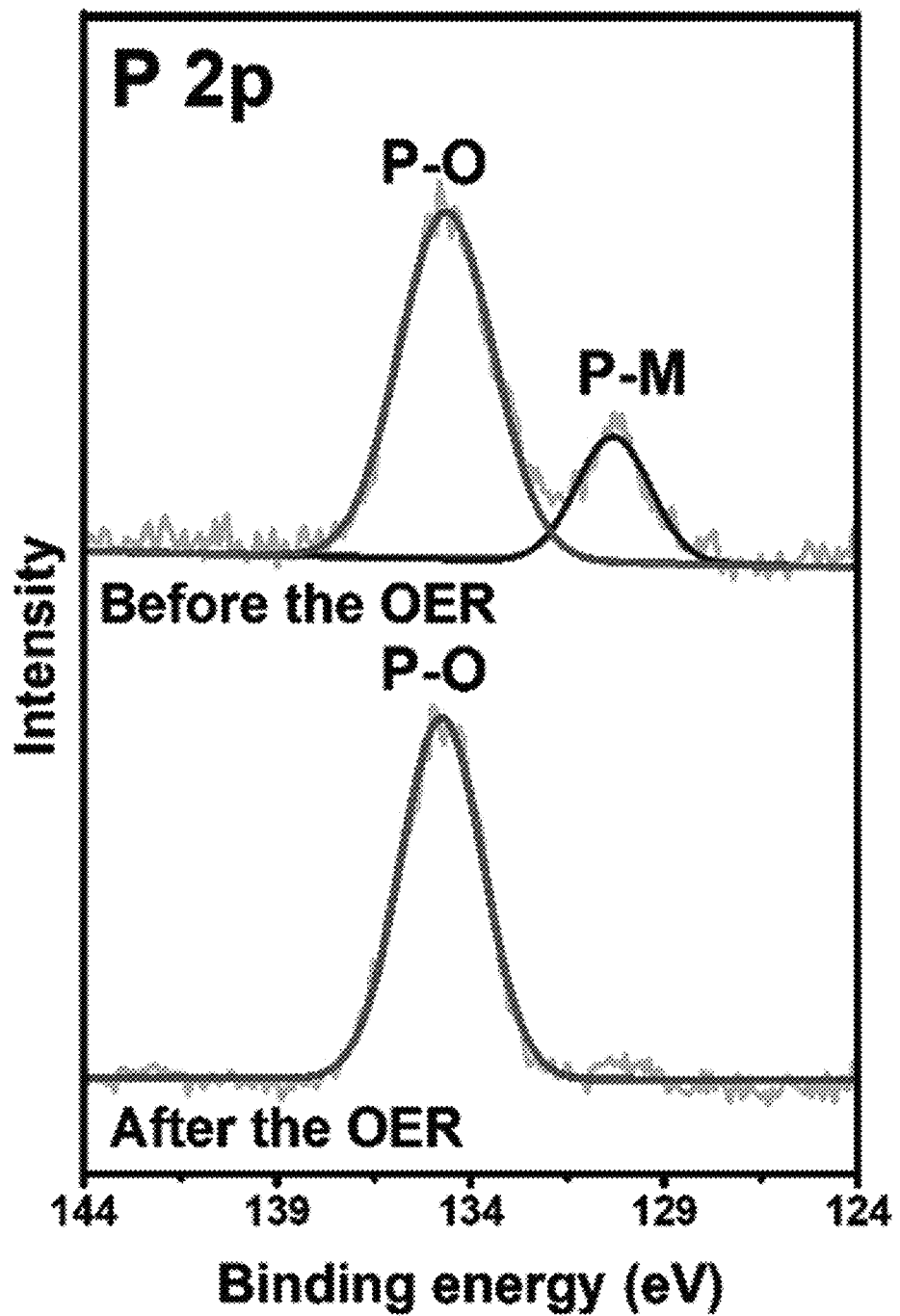

FIGS. 7A to 7C show the XPS analysis results of the NiFeP nanowire prepared in Example 2. FIGS. 7A to 7C show the change in Ni 2p, Fe 2p and P 2p XPS spectra before and after oxygen evolution reaction. The Ni 2p spectra of FIG. 7A show two valence states Ni$^{2+}$ and Ni$^{\delta+}$ before the oxygen evolution reaction, suggesting that Ni was present as a mixture of Ni—O and Ni—P. After the oxygen evolution reaction, the Ni$^{\delta+}$ peak almost disappeared and the Ni$^{2+}$ peak became stronger. This result indicates that Ni—P was converted to Ni—O on the catalyst surface during the oxygen evolution reaction.

In addition, the P 2p spectra of FIG. 7C show that, whereas metal phosphide (P-M) and phosphate (P—O) existed before the oxygen evolution reaction, the P-M peak was decreased rapidly after the oxygen evolution reaction. It was confirmed that the phosphate, which is known to play an important role in proton bonding and charge transfer during oxygen evolution reaction, continues to exist after the oxygen evolution reaction.

In contrast, the Fe 2p spectra of FIG. 7B show similar bonding states before and after the oxygen evolution reaction. During the oxygen evolution reaction, the Fe$^{2+}$ (713.9 and 725.9 eV) and Fe$^{\delta+}$ peaks (708.6 eV) showed no change. This suggests that Fe facilitates OER by changing the bonding state of NiO without participating in OER directly.

Test Example 4-1: Analysis of Performance of Catalyst for Hydrogen Evolution Reaction The performance of the NiMP/NF nanowires (M=Mo, Fe, V or Co) prepared in Examples 1-4 and Comparative Examples 1 and 3 as catalysts for hydrogen evolution reaction was evaluated under an alkaline condition. The result is shown in FIGS. 8A to 8D.

FIGS. 8A to 8D show the (FIG. 8A) LSV curves and (FIG. 8B) Tafel plots for hydrogen evolution reaction for the NiMP/NF nanowires (M=Mo, Fe, V or Co) prepared in Examples 1-4 and Comparative Examples 1 and 3, (FIG. 8C) the voltage of NiMoP of Example 1 at 10 mA/cm$^2$ depending on time and SEM images before and after 60 hours of HER, and (FIG. 8D) the CV curves of NiMoP before and after 5000 cycles of hydrogen evolution reaction.

Figure 8A:
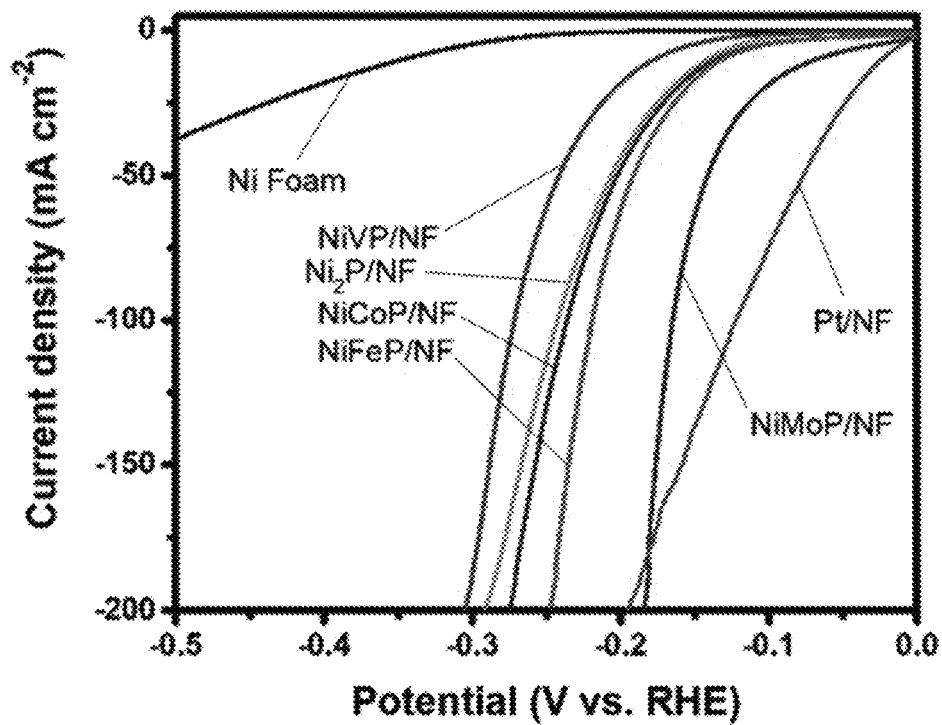
FIGS. 8A to 8D show the (FIG. 8A) LSV curves and (FIG. 8B) Tafel plots for hydrogen evolution reaction for NiMP/NF nanowires (M=Mo, Fe, V or Co) prepared in Examples 1-4 and Comparative Examples 1 and 3, (FIG. 8C) the voltage of NiMoP of Example 1 at 10 mA/cm² depending on time and SEM images before and after 60 hours of HER, and (FIG. 8D) the CV curves of NiMoP before and after 5000 cycles of hydrogen evolution reaction.

Referring to FIG. 8A, the overvoltage required to attain the current density of 10 mA/cm$^2$ ($\eta_{10}$) in 1.0 M KOH was 143 mV for Ni$_2$P. Except for NiVF ($\eta_{10}$=179 mV), the NiMP samples NiCoP, NiFeP and NiMoP showed lower $\eta_{10}$ values than Ni$_2$P as 137, 133 and 68 mV, respectively. In particular, NiMoP showed the lowest $\eta_{10}$ value among the NiMP samples. Although the $\eta_{10}$ value of NiMoF was higher than that of Pt ($\eta_{10}$=24 mV), the difference was decreased at higher current density and was reversed at ~180 mA/cm$^2$.

Figure 8B:
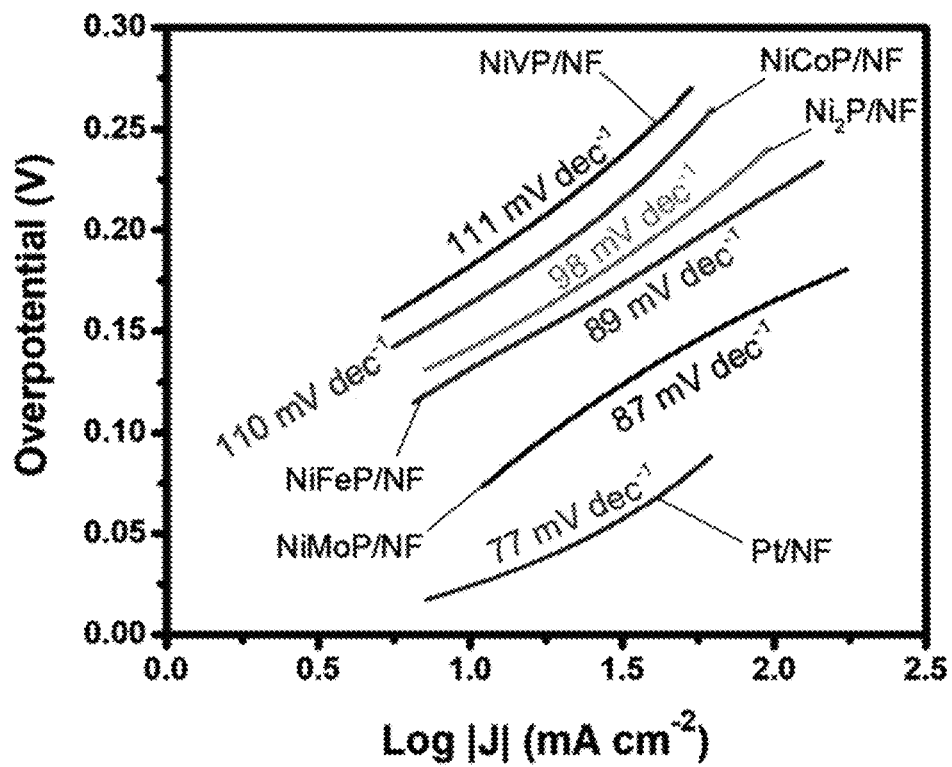

In addition, referring to FIG. 8B, Pt showed the lowest Tafel slope of 77 mV/dec, and the NiMoP nanowire showed the second lowest slope as 87 mV/dec.

Figure 8C:
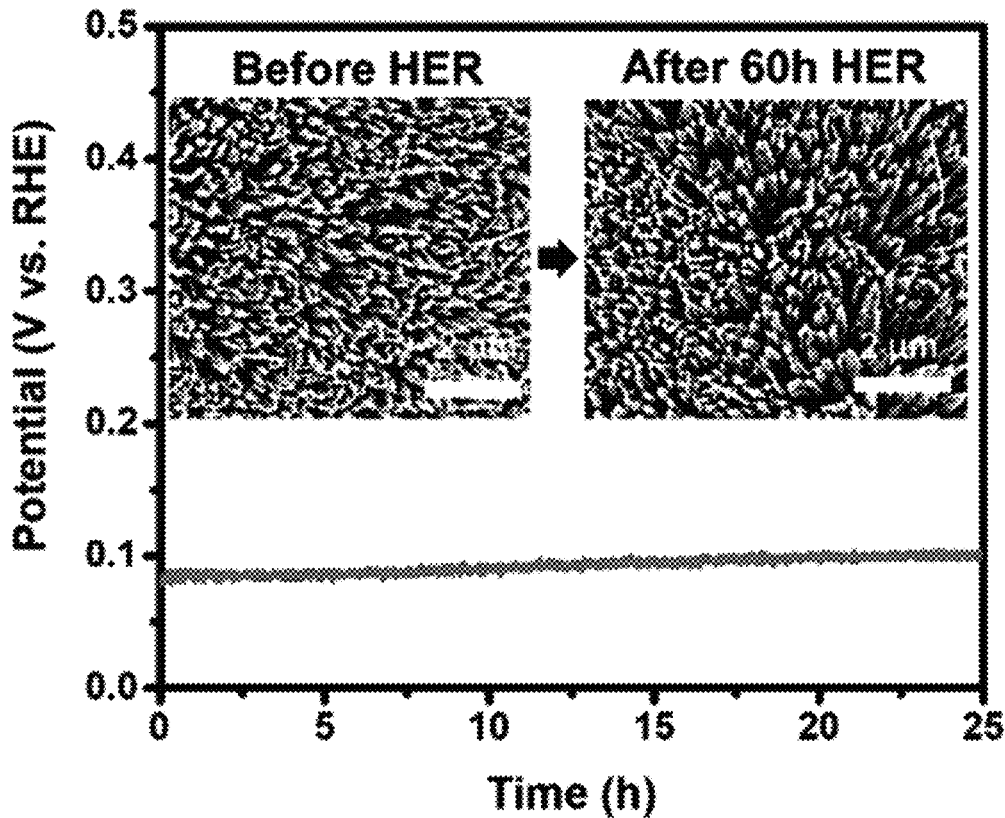
Figure 8D:
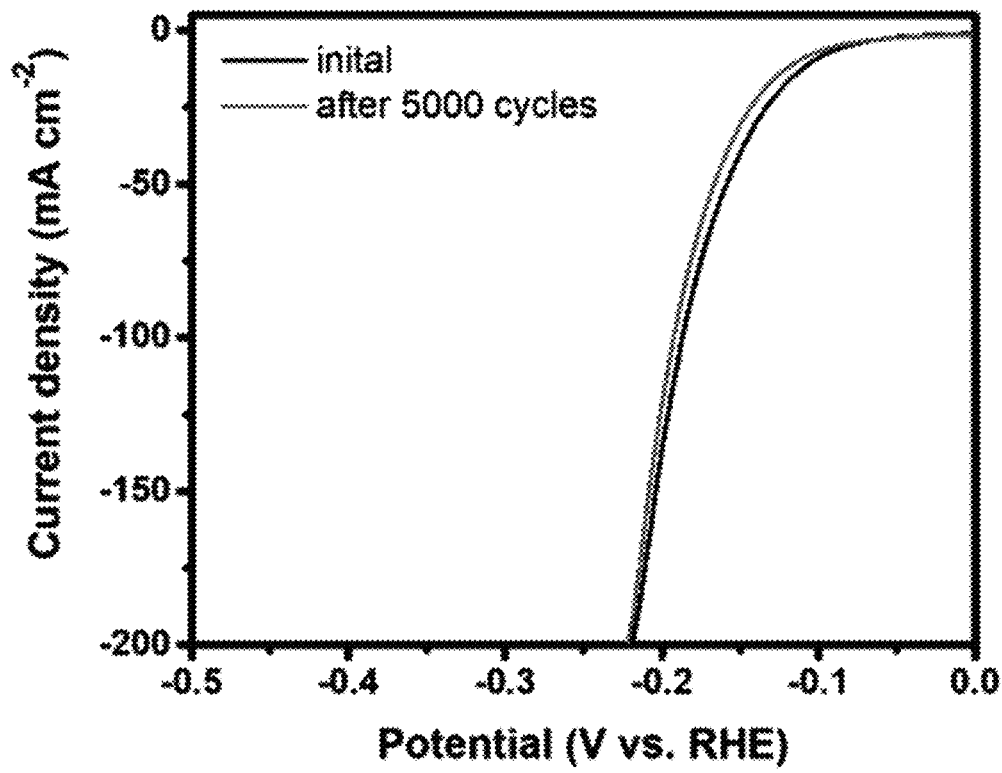

FIGS. 8C and 8D show the result of chronopotentiometry and repeated CV measurement for testing the stability of the NiMoP of Example 1 for hydrogen evolution reaction. Referring to FIG. 8C, stable current density of 10 mA/cm$^2$ was maintained for 25 hours of hydrogen evolution reaction, and only ~14 mV of increase in overvoltage was observed. In addition, as seen from FIG. 8D, only very slight increase was observed after 5000 cycles. This indicates that the NiMoP nanowire has high stability for hydrogen evolution reaction under an alkaline condition. In addition, it suggests that it is advantageous for actual operation condition because the difference converges to 0 as the current density is increased. These results show that the NiMoP nanowire is the most effective catalyst having high stability for hydrogen evolution reaction and can excel the precious metal catalyst Pt in high-current HER.

Test Example 4-2: XPS Analysis

The NiFeP nanowire of Example 1 was analyzed by X-ray photoelectron spectroscopy (XPS) for investigation of chemical bonding. The result is shown in FIGS. 9A to 9C.

Figure 9A:
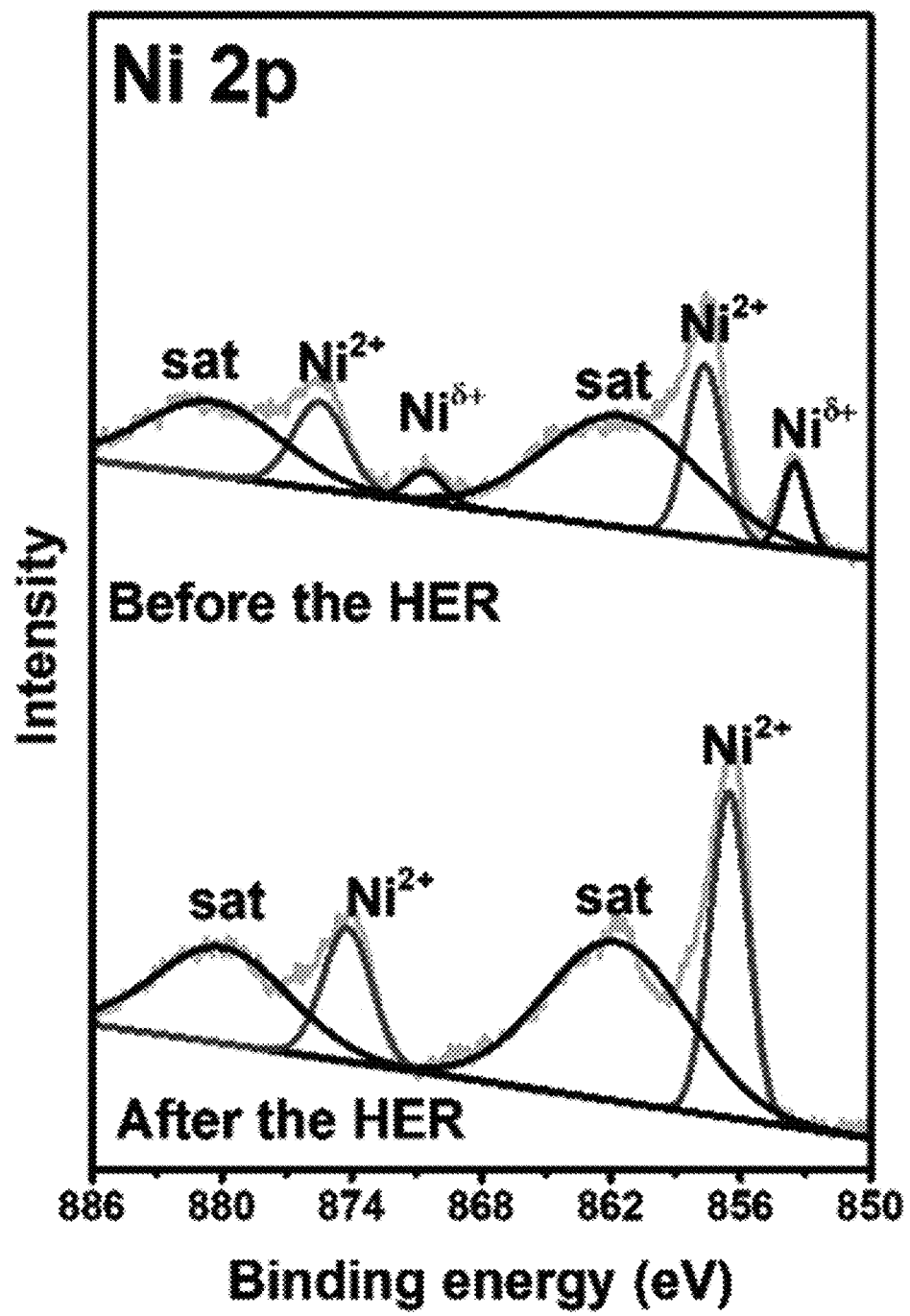
FIGS. 9A to 9C show the XPS analysis results of a NiMoP nanowire prepared in Example 1.
Figure 9B:
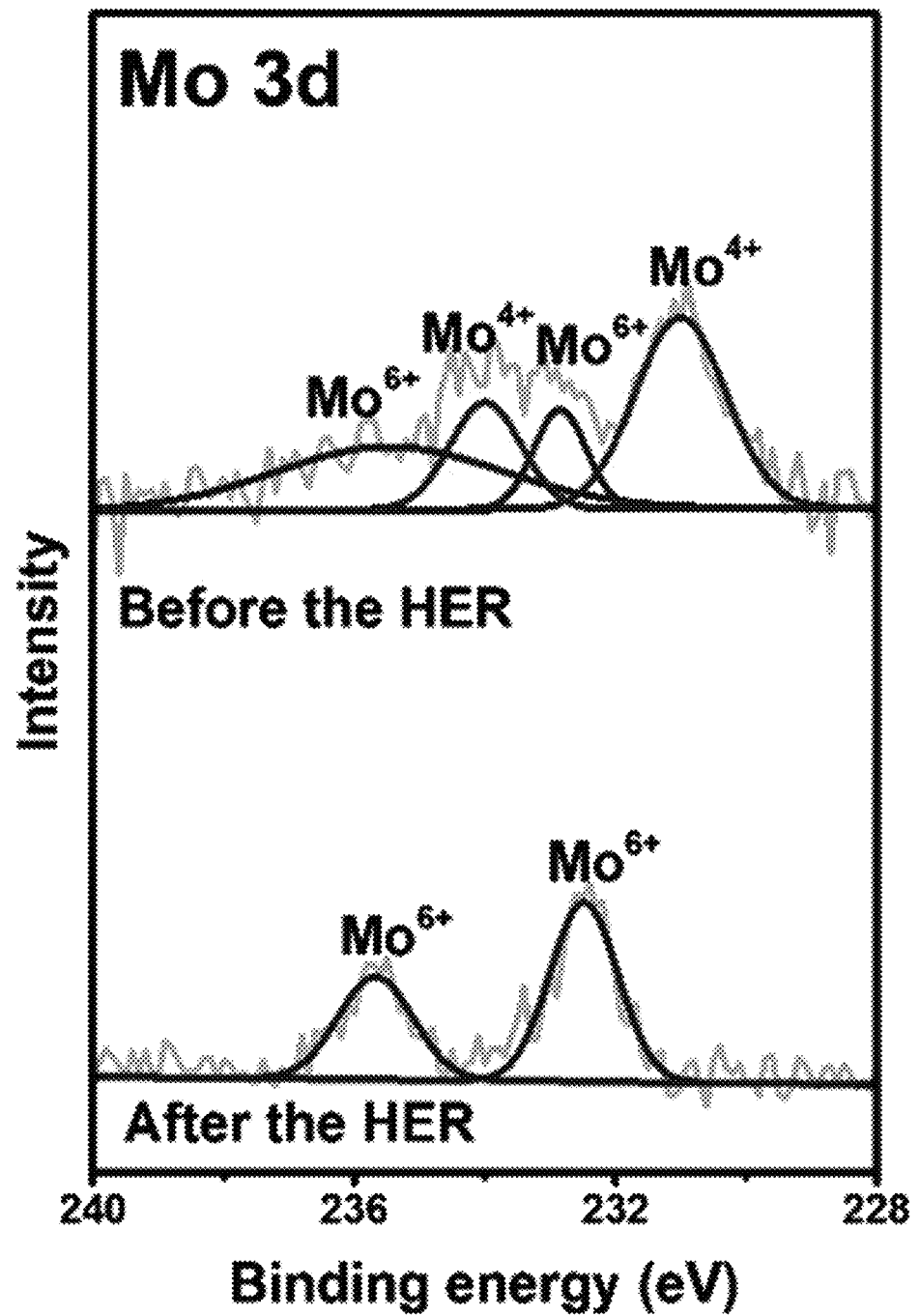
Figure 9C:
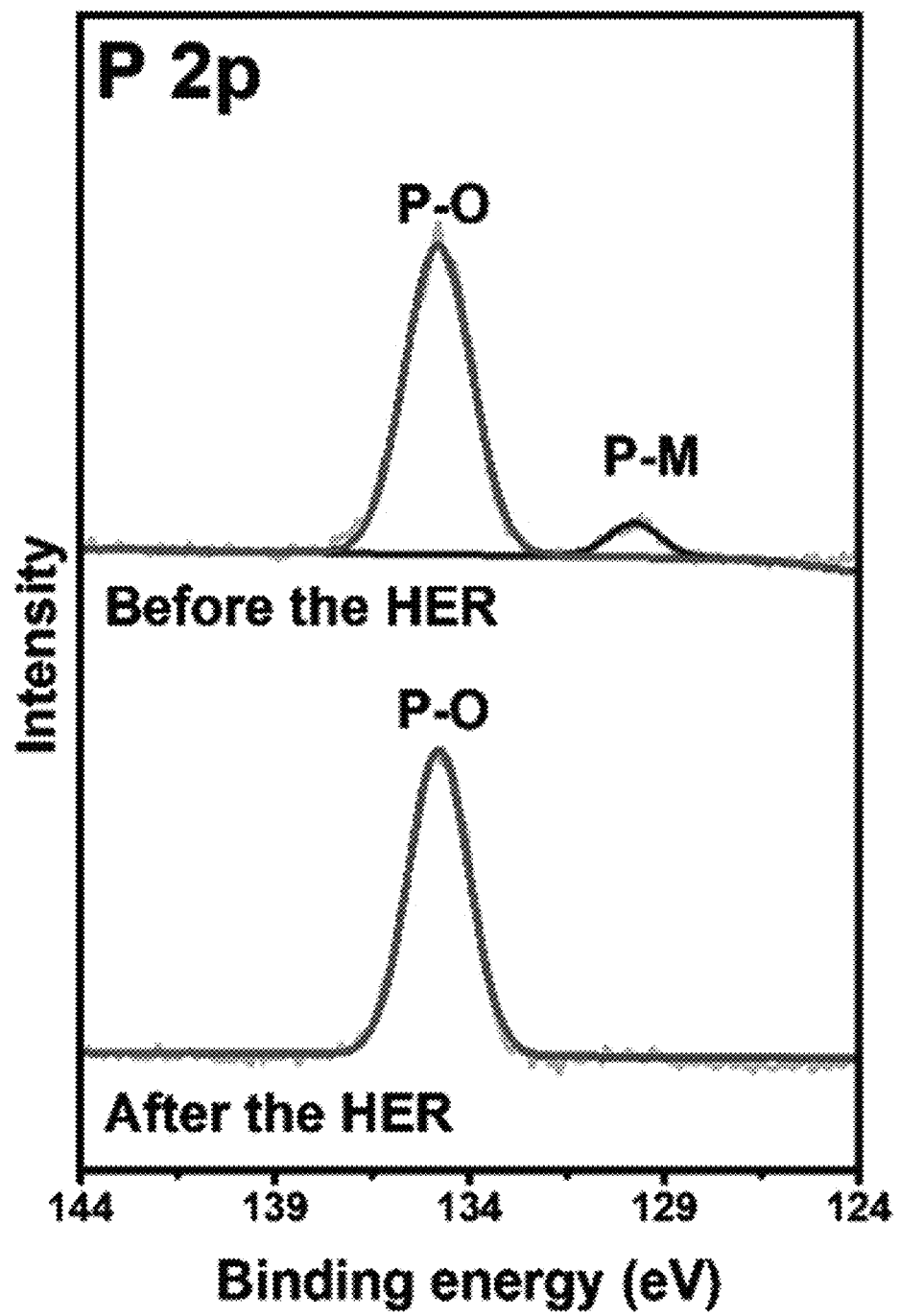

FIGS. 9A to 9C show the XPS analysis result of the NiMoP nanowire prepared in Example 1. FIGS. 9A to 9C show the change in the Ni 2p, Mo 3d and P 2p XPS spectra before and after hydrogen evolution reaction. The Ni 2p spectra of FIG. 9A show that, whereas both Ni$^{2+}$ and Ni$^{\delta+}$ peaks existed before HER, they were completely changed to the Ni$^{2+}$ peak after HER. The Mo 3d spectra of FIG. 9B also show a similar result. The Mo$^{4+}$ peak disappeared completely and only the Mo$^{6+}$ peak remained after HER. In addition, the P 2p spectra of FIG. 9C show that the P-M peak disappeared and only the phosphate peak remained after HER.

The oxidation of NiMoP can be explained by the mechanism of hydrogen evolution reaction under an alkaline pH condition, wherein $H_2O$ participates in HER as a reactant instead of ionic $H^+$. Unlike the simple Volmer step (adsorption of $H^+$) of hydrogen evolution reaction under an acidic condition, the alkaline HER condition requires additional adsorption of $H_2O$ and remains $OH^-$ around the catalyst surface. Accordingly, the introduction of O adsorption sites around the H adsorption sites is helpful in effectively accommodating and braking the H—O bond of $H_2O$ such as $Ni(OH)_2$ clusters on Pt under an alkaline HER condition. This suggests that $OH^-$ remains on the surface of Ni and Mo sites of the NiMoP catalyst and facilitates oxide formation by the catalyst.

Test Example 5: Analysis of Performance of Water Decomposition

The performance of the NiMP/NF nanowires (M=Mo or Fe), the Pt/NF nanowire and the $IrO_2$/NF nanowire prepared in Examples 1 and 2 and Comparative Examples 2 and 3 for water decomposition as a catalyst for hydrogen evolution reaction electrode or a catalyst for oxygen evolution reaction electrode under an alkaline condition was evaluated. The result is shown in FIGS. 10A to 10D.

FIGS. 10A to 10D show (FIG. 10A) the LSV curves, (FIG. 10B) the stability test result at 10 mA/cm² for 60 hours, (FIG. 10C) the expected and actual production of $H_2$ and $O_2$, and (FIG. 10D) the comparison with metal phosphide nanowires described in literatures for water decomposition of NiMoP/NF-NiFeP/NF and Pt/NF-$IrO_2$/NF catalyst electrodes using the NiMP/NF nanowire (M=Mo or Fe), Pt/NF or $IrO_2$/NF prepared in Examples 1 and 2 and Comparative Examples 2 and 3.

Figure 10A:
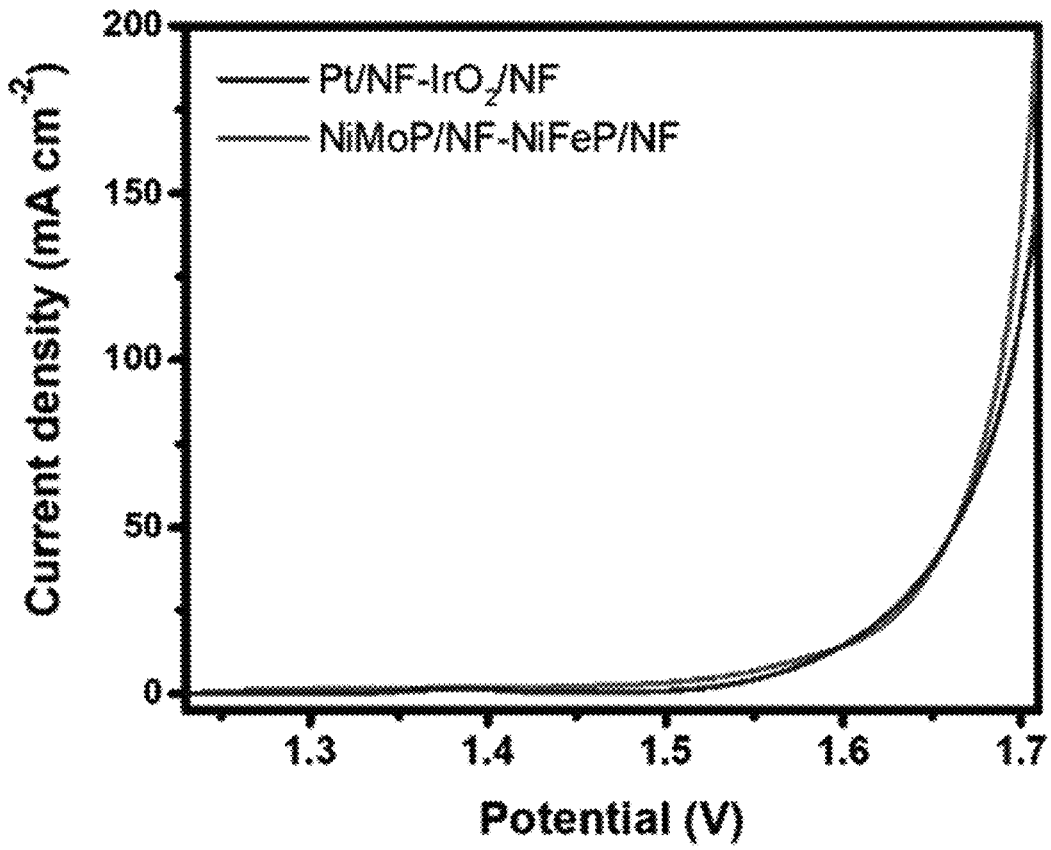
FIGS. 10A to 10D show (FIG. 10A) the LSV curves, (FIG. 10B) the stability test result at 10 mA/cm² for 60 hours, (FIG. 10C) the expected and actual production of $H_2$ and $O_2$ for NiMoP/NF-NiFeP/NF and Pt/NF—$IrO_2$/NF catalyst electrodes using a NiMP/NF nanowire (M=Mo or Fe), Pt/NF or $IrO_2$/NF prepared in Examples 1 and 2 and Comparative Examples 2 and 3, and (FIG. 10D) the comparison with metal phosphide nanowires described in literatures for water decomposition

FIG. 10A compares the LSV measurement result of NiMoP/NiFeP under an alkaline 1.0 M KOH environment with that of Pt/$IrO_2$. It was confirmed that the potential required to attain 10 mA/cm² was 1.57 V for NiMoP/NiFeP, which was lower than that of Pt/$IrO_2$ (1.59 V). The difference was increased at higher current values of 150 mA/cm² or higher.

Figure 10B:
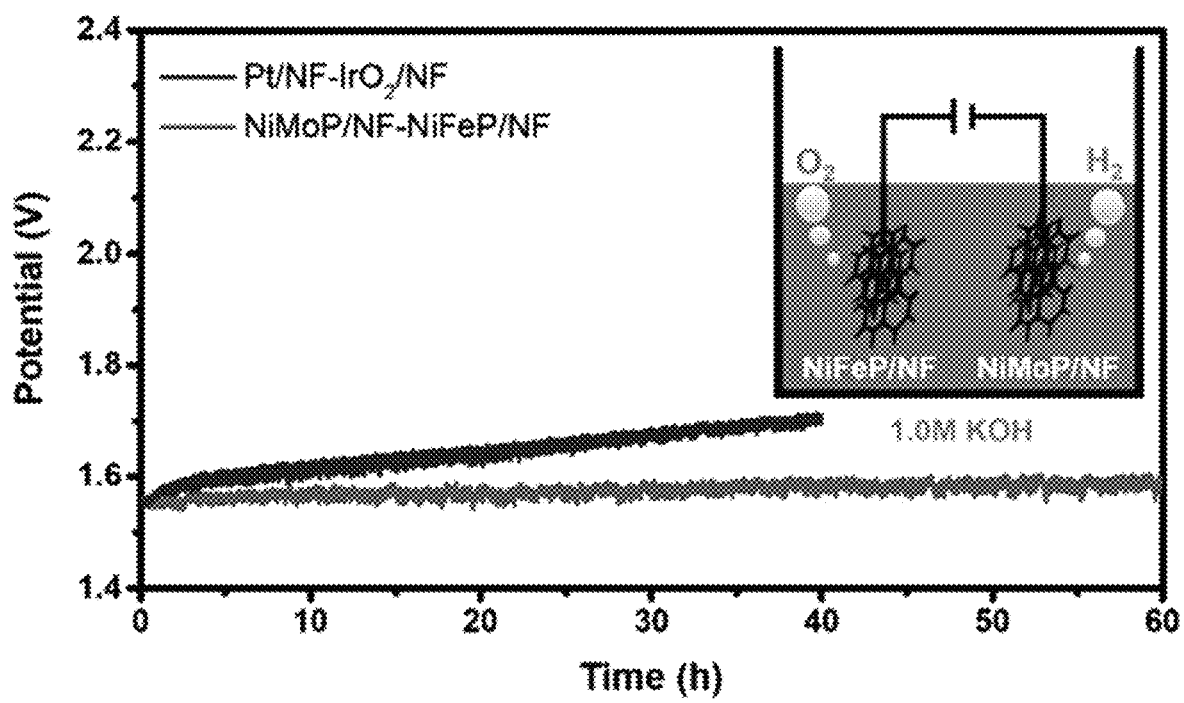

FIG. 10B shows the result of testing the stability for OWS by chronopotentiometry for 60 hours. Whereas the potential was increased slightly by 15 mV (~1%) within 60 hours for the NiMoP/NiFeP, the potential was increased by ~170 mV within 40 hours for Pt/$IrO_2$. This result indicates that the NiMoP/NiFeP water decomposition system is valuable as an effective and durable catalyst for alkaline water decomposition.

Figure 10C:
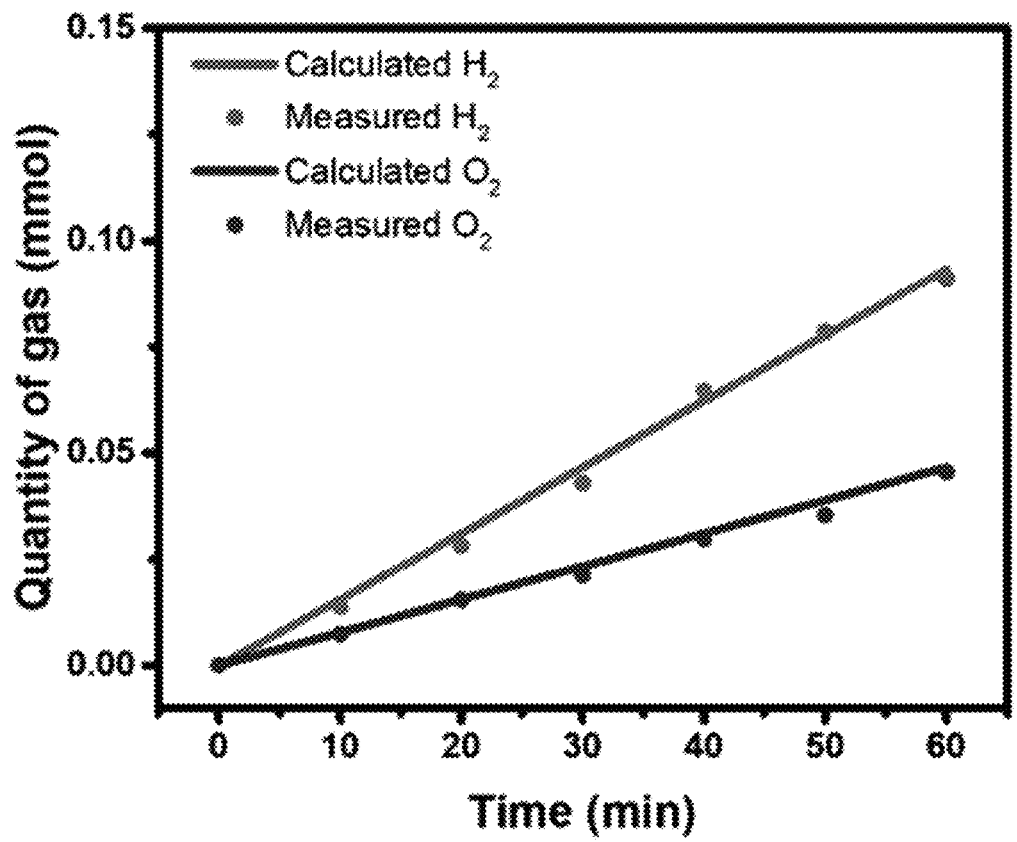

FIG. 10C shows the result of measuring actual gas ($H_2$/$O_2$) production by a water decomposition system using NiMoP/NiFeP at a fixed current density of 10 mA/cm². The gas composition was analyzed at 10-minute intervals by gas chromatography (GC). It was confirmed that the production of $H_2$ and $O_2$ during water decomposition was increased linearly with time at a rate of 91.2 and 45.6 μmol/hr, respectively. The ratio of $H_2$:$O_2$ was close to the stoichiometric ratio of 2:1, suggesting that they were produced from water splitting. High Faraday efficiency could be obtained as 97.7% ($H_2$) and 97.6% ($O_2$) as compared to the theoretical values.

Figure 10D:
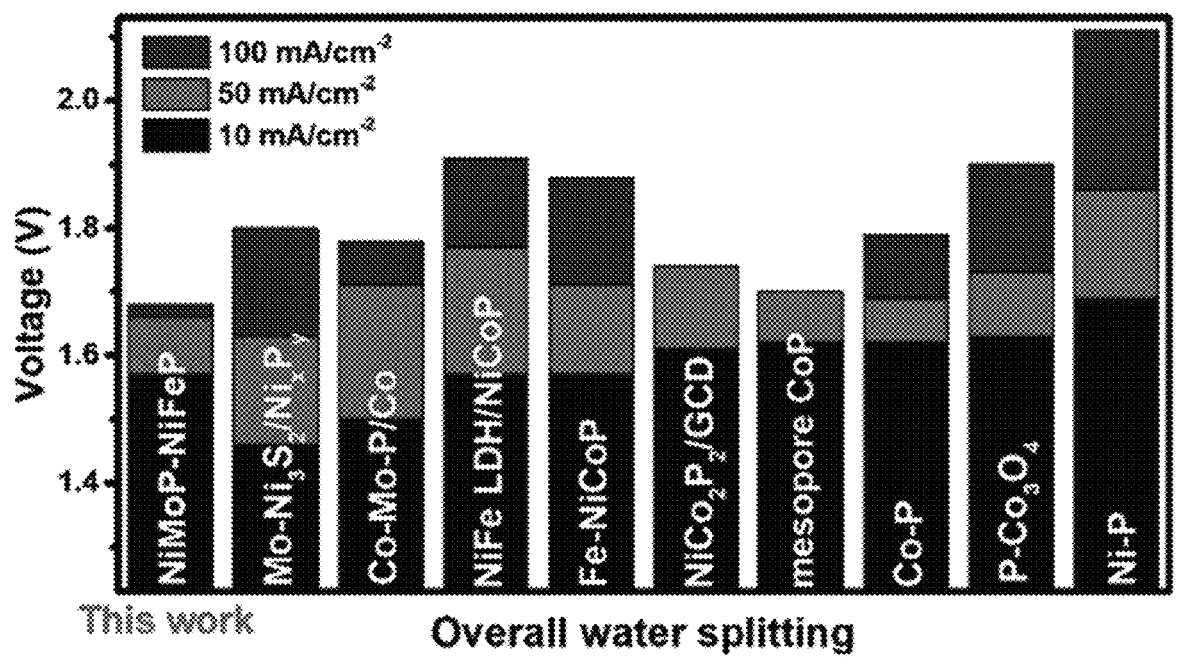

FIG. 10D compares the performance of the NiMoP/NiFeP OWS catalyst with recently reported other transition metal phosphide NW catalysts. The voltages required to generate the currents of 10, 50 and 100 mA/cm² were compared for the catalyst materials. It was confirmed that the NiMoP/NiFeP catalyst exhibits high catalytic activity as compared to other metal phosphide NWs. In particular, the NiMoP/NiFeP catalyst showed superior catalytic activity as compared to other catalysts at higher currents. The NiMoP/NiFeP catalyst required only 1.71 V to generate 200 mA/cm², which was significantly lower as compared to other catalysts. This result is attributed to the many active sites and low energy barrier of the NiMoP/NiFeP catalyst.

As discussed above, the NiMP/NF nanowires (M=Mo, Fe, V or Co) of the present disclosure can be used as a catalyst for hydrogen evolution reaction or a catalyst for oxygen evolution reaction. NiMP showed improved efficiency of oxygen evolution reaction as compared to $Ni_2P$. In particular, the NiMoP/NF nanowire of Example 1 showed low $\eta_{10}$ (68 mV) and Tafel slope (87 mV/dec) as a HER catalyst under an alkaline pH condition. Although these values were higher than that of Pt, the performance of the catalyst excelled that of Pt at a current density of ~180 mA/cm² or higher, and a low overvoltage of 68 mV was required to generate 10 mA/cm².

In addition, the NiFeP/NF nanowire of Example 2 showed the lowest $\eta_{100}$ (279 mV) and Tafel slope (34 mV/dec) as an OER catalyst under an alkaline OER condition. The catalyst showed high OER activity with a low overvoltage of 279 mV for generating 100 mA/cm², which was much superior as compared to the precious metal OER catalyst $IrO_2$. It was confirmed that such high OER catalytic activity is due to the large reaction area and low energy barrier of the NiFeP.

Furthermore, a water decomposition device including a combination of NiMoP (hydrogen evolution)/NiFeP (oxygen evolution) required voltages of only 1.57 V and 1.66 V for generating current densities of 10 and 100 mA/cm², respectively, and showed high durability for 60 hours or longer. This result indicates that, among the metal phosphide NW catalysts, the NiMoP/NiFeP of the present disclosure exhibits the best catalytic activity, requiring the lowest voltage particularly at the high current density of 100 mA/cm². In addition, from the actual gas measurement, it was confirmed that water splitting was achieved with a high Faraday efficiency of 97% or higher, with a stoichiometric ratio of $H_2$:$O_2$=2:1.

What is claimed is:

1. A method for preparing a transition metal-doped nickel phosphide nanostructure, comprising:
    a step of adding a zinc precursor and a hydroxide on a substrate and growing a plural zinc oxide nanostructures aligned on the substrate in a vertical direction;
    a step of adding a nickel precursor and a transition metal precursor on the zinc oxide nanostructure and converting the zinc oxide nanostructure to a transition metal-doped nickel oxide nanostructure through primary heat treatment; and
    a step of adding a phosphorus precursor to the transition metal-doped nickel oxide nanostructure and preparing a transition metal-doped nickel phosphide nanostructure through secondary heat treatment.

2. The method for preparing a transition metal-doped nickel phosphide nanostructure according to claim 1, wherein the zinc precursor is one or more selected from a group consisting of $Zn(NO_3)_2$, $Zn(OH)_2$ and $Zn(CH_3)_2$.

3. The method for preparing a transition metal-doped nickel phosphide nanostructure according to claim 1, wherein the hydroxide is one or more selected from a group consisting of ammonium hydroxide ($NH_4OH$), sodium hydroxide (NaOH), potassium hydroxide (KOH), barium hydroxide ($Ba(OH)_2$) and lithium hydroxide (LiOH).

4. The method for preparing a transition metal-doped nickel phosphide nanostructure according to claim 1, wherein the zinc oxide nanostructure is grown by hydrothermal synthesis.

5. The method for preparing a transition metal-doped nickel phosphide nanostructure according to claim 4, wherein the hydrothermal synthesis is performed at 80-200° C. for 2-24 hours.

6. The method for preparing a transition metal-doped nickel phosphide nanostructure according to claim 1, wherein the nickel precursor is one or more selected from a group consisting of nickel acetate, nickel halide, nickel nitrate, nickel hydroxide and nickel carbonyl.

7. The method for preparing a transition metal-doped nickel phosphide nanostructure according to claim 1, wherein the transition metal precursor is $M_xCl_y$ (wherein M is Mo, Fe, V or Co, x satisfies $1 \leq x \leq 5$ and y satisfies $2 \leq y \leq 10$).

8. The method for preparing a transition metal-doped nickel phosphide nanostructure according to claim 1, wherein, in the conversion to the transition metal-doped nickel oxide nanostructure, the primary heat treatment is performed by cation exchange at 550-850° C. for 0.3-4 hours.

9. The method for preparing a transition metal-doped nickel phosphide nanostructure according to claim 1, wherein the phosphorus precursor is one or more selected from a group consisting of sodium hypophosphite ($NaPO_2H_2 \cdot H_2O$), phosphoric acid ($H_3PO_4$), monoammonium phosphate ($NH_4H_2PO_4$), diammonium phosphate (($NH_4)_2HPO_4$), triethylphosphine (($C_2H_5)_3P$) and trimethylphosphine (($CH_3)_3P$).

10. The method for preparing a transition metal-doped nickel phosphide nanostructure according to claim 1, wherein, in the preparation of the transition metal-doped nickel phosphide nanostructure, phosphorization is achieved by performing the secondary heat treatment at 300-500° C. for 0.5-4 hours.

11. The method for preparing a transition metal-doped nickel phosphide nanostructure according to claim 1, wherein the nickel phosphide nanostructure has an interplanar distance (d-spacing) of 0.1-0.5 nm as measured by X-ray diffractometry.

12. The method for preparing a transition metal-doped nickel phosphide nanostructure according to claim 1, wherein
the substrate is nickel foam,
the zinc precursor is $Zn(NO_3)_2$,
the hydroxide is ammonium hydroxide ($NH_4OH$),
the zinc oxide nanostructure is grown by conducting hydrothermal synthesis at 90-100° C. for 6-8 hours,
the nickel precursor is $NiCl_2$,
the transition metal precursor is $Mo_2Cl_{10}$ or $FeCl_3$,
in the conversion to the transition metal-doped nickel oxide nanostructure, the primary heat treatment is conducted by cation exchange at 590-610° C. for 0.5-1 hour,
the phosphorus precursor is sodium hypophosphite ($NaPO_2H_2 \cdot H_2O$),
in the preparation of the transition metal-doped nickel phosphide nanostructure, phosphorization is achieved by conducting the secondary heat treatment at 430-470° C. for 1-2 hours,
the doping amount of the transition metal in the transition metal-doped nickel phosphide nanostructure is 7-16 wt % based on 100 wt % of the nickel phosphide nanostructure, and
the nickel phosphide nanostructure has an interplanar distance (d-spacing) of 0.21-0.24 nm as measured by X-ray diffractometry.

\* \* \* \* \*